United States Patent
McDowell

(10) Patent No.: US 7,647,136 B2
(45) Date of Patent: Jan. 12, 2010

(54) METHOD AND APPARATUS FOR ENHANCING OPERATION OF A FLUID TRANSPORT PIPELINE

(75) Inventor: Keith C. McDowell, Houston, TX (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 48 days.

(21) Appl. No.: 11/730,241

(22) Filed: Mar. 30, 2007

(65) Prior Publication Data

US 2008/0082215 A1    Apr. 3, 2008

Related U.S. Application Data

(60) Provisional application No. 60/847,668, filed on Sep. 28, 2006.

(51) Int. Cl.
| | |
|---|---|
| G05D 7/00 | (2006.01) |
| G05D 11/00 | (2006.01) |
| G05B 13/02 | (2006.01) |
| G01F 1/86 | (2006.01) |
| G01F 7/00 | (2006.01) |
| B67D 5/00 | (2006.01) |
| G06F 17/00 | (2006.01) |
| G01F 15/02 | (2006.01) |
| G01F 1/74 | (2006.01) |
| G01F 1/28 | (2006.01) |
| F17D 1/00 | (2006.01) |

(52) U.S. Cl. ............... 700/282; 700/32; 700/46; 702/45; 705/413; 73/861.01; 73/861.04; 73/861.71; 137/12; 137/13

(58) Field of Classification Search ............ 700/28, 700/32, 46, 282; 702/45, 51; 705/412, 413; 137/1, 2, 12, 13, 486, 488; 73/700, 861.01, 73/861.04, 861.71

See application file for complete search history.

(56) References Cited

U.S. PATENT DOCUMENTS 3,095,888 A    7/1963 Kline et al.

(Continued)

FOREIGN PATENT DOCUMENTS

JP    58000700 A  *  1/1983

(Continued)

OTHER PUBLICATIONS

Verde et al., "Identificability of multi-leaks in a pipeline", Proceedings of the 2004 American Control Conference, vol. 5, Jun. 30-Jul. 2, 2004, pp. 4378-4383.*

(Continued)

*Primary Examiner*—Crystal J Barnes-Bullock
(74) *Attorney, Agent, or Firm*—Brent R. Knight; W. Robinson H. Clark

(57) ABSTRACT

The present application is directed to an apparatus and method of managing transport of fluid commodities in a pipeline network. The method includes obtaining operational settings, which include equipment settings and measured parameters, associated with a pipeline network as a fluid commodity is transported through the pipeline network. From the operational settings, a recommendation is generated concurrently with the transport of the fluid commodity through the pipeline network to optimize at least one of the operational settings. The recommendation comprises revised equipment settings associated with equipment disposed along the pipeline network. The equipment settings in the recommendation may be based on empirical data from previous experience with the transport of fluid commodities through the pipeline network and/or based on theoretical data from modeling of the transport of the fluid commodity through the pipeline network.

23 Claims, 11 Drawing Sheets

U.S. PATENT DOCUMENTS

| | | | | |
|---|---|---|---|---|
| 3,750,687 | A * | 8/1973 | Williams | 137/1 |
| 4,200,911 | A * | 4/1980 | Matsumoto | 700/28 |
| 4,708,166 | A * | 11/1987 | Kobold | 137/512.1 |
| 5,272,646 | A * | 12/1993 | Farmer | 702/51 |
| 5,289,561 | A | 2/1994 | Costa Filho | |
| 5,504,693 | A | 4/1996 | Elliott et al. | |
| 5,940,290 | A * | 8/1999 | Dixon | 700/9 |
| 5,983,164 | A * | 11/1999 | Ocondi | 702/12 |
| 6,041,856 | A * | 3/2000 | Thrasher et al. | 166/53 |
| 6,131,597 | A * | 10/2000 | Mendicino et al. | 137/15.14 |
| 6,178,980 | B1 | 1/2001 | Storm | |
| 6,308,787 | B1 * | 10/2001 | Alft | 175/48 |
| 6,701,223 | B1 | 3/2004 | Rachford, Jr. et al. | |
| 6,799,195 | B1 | 9/2004 | Thibault et al. | |
| 6,850,849 | B1 * | 2/2005 | Roys | 702/45 |
| 6,851,444 | B1 | 2/2005 | Kohl et al. | |
| 6,915,707 | B2 * | 7/2005 | Nyfors et al. | 73/861.63 |
| 6,961,753 | B1 | 11/2005 | Osburn, III | |
| 6,970,808 | B2 * | 11/2005 | Abhulimen et al. | 702/185 |
| 6,988,857 | B2 * | 1/2006 | Kroemmer et al. | 406/34 |
| 7,274,996 | B2 * | 9/2007 | Lapinski et al. | 702/48 |
| 7,287,540 | B2 * | 10/2007 | Hammonds et al. | 137/13 |
| 7,374,127 | B2 * | 5/2008 | Gallagher et al. | 242/444 |
| 2002/0035551 | A1 * | 3/2002 | Sherwin et al. | 705/412 |
| 2005/0166961 | A1 | 8/2005 | Means et al. | |
| 2005/0283276 | A1 * | 12/2005 | Prescott et al. | 700/282 |
| 2006/0009881 | A1 | 1/2006 | Ferber et al. | |
| 2007/0168174 | A1 * | 7/2007 | Davari et al. | 703/18 |

FOREIGN PATENT DOCUMENTS

JP        08021599 A  *  1/1996

OTHER PUBLICATIONS

Sybille Handley-Schachler et al., "New Mathematical Techniques for the Optmization of Oil and Gas Production System", SPE European Petroleum Conference, Oct. 24-25, 2000 . . . .

Nestor Martinez-Romero et al., "Natural Gas Network Optimization and Sensibility Analysis" SPE International Petroleum Conference and Exhibition in Mexico, Feb. 10-12, 2002 . . . .

M. K. Lane et al., Special Session: "Energy Bridge LNG Projects: Technology Innovation to Date and into the Future", OTC 018397, 2006.

Mike Chunn et al., "Case History: New Gas Flow Computer Design Facilities Offshore Measurement in Gulf Coast Project", OTC 008798, 1998.

International Search Report.

* cited by examiner

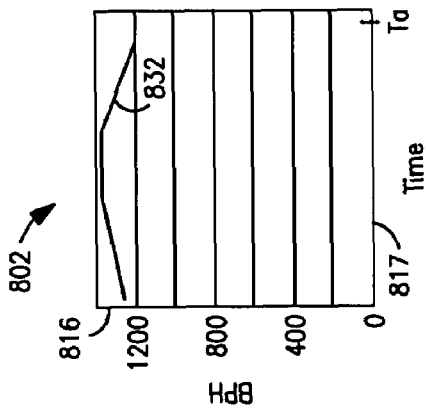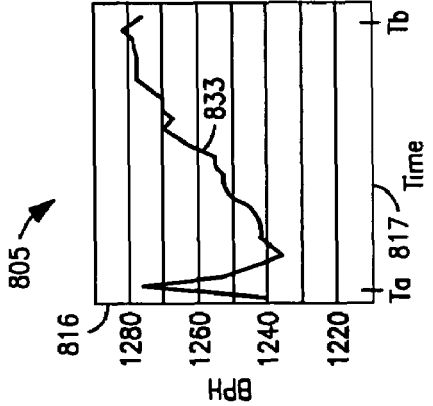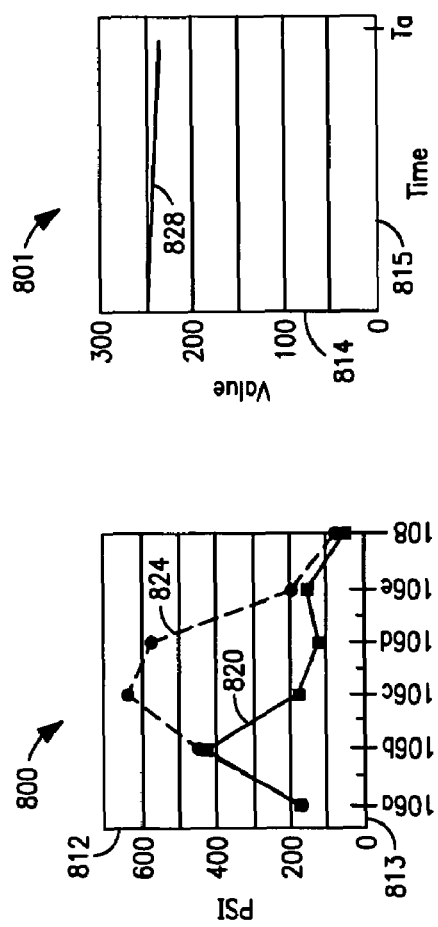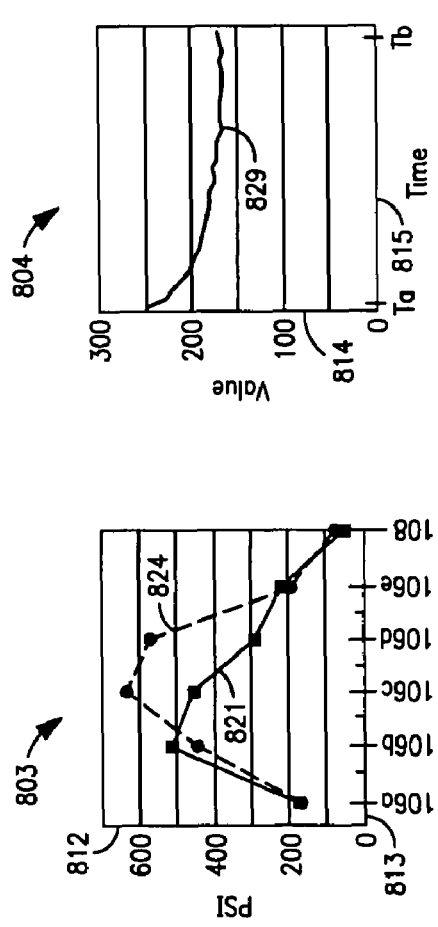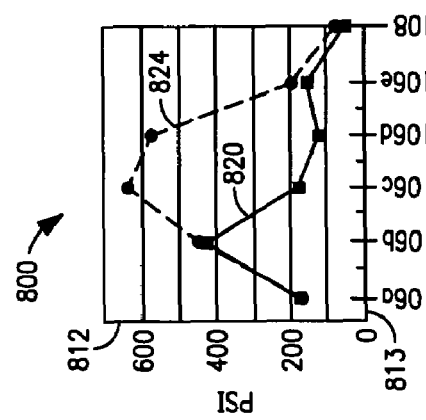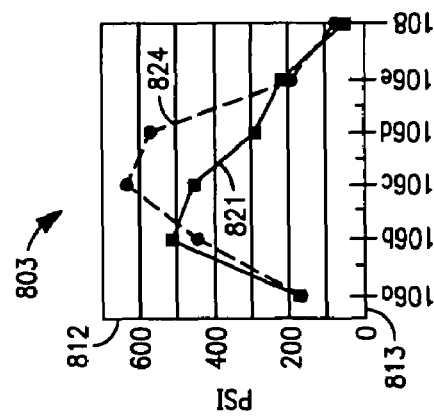

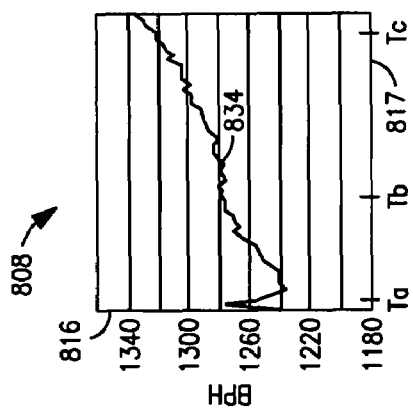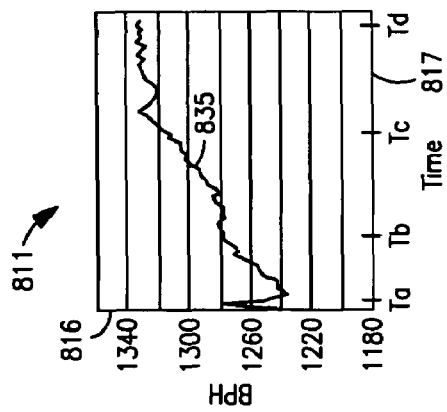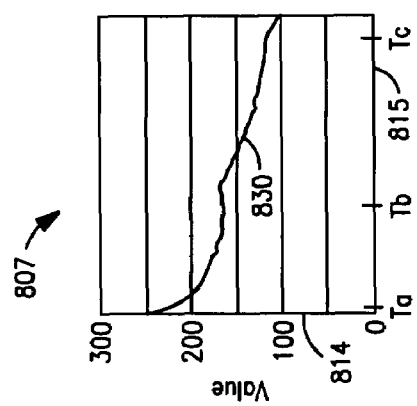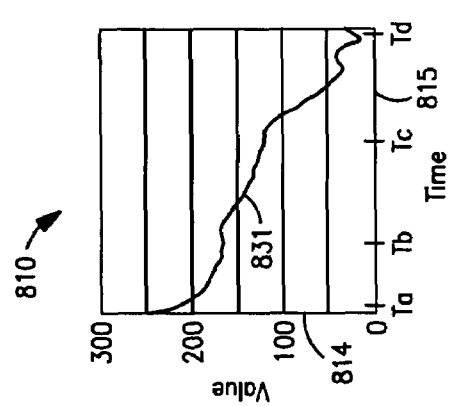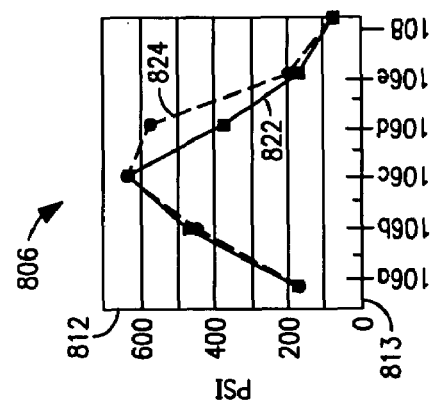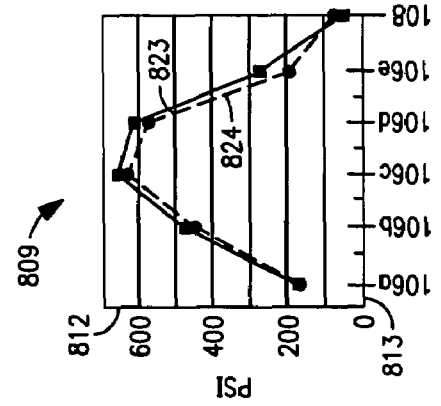

METHOD AND APPARATUS FOR ENHANCING OPERATION OF A FLUID TRANSPORT PIPELINE

CROSS REFERENCE TO RELATED APPLICATION

This invention relates and claims priority to U.S. Provisional Patent Application No. 60/847,668, filed on Sep. 28, 2006, entitled "Method And Apparatus For Enhancing Operation Of A Fluid Transport Pipeline".

FIELD OF THE INVENTION

This invention relates generally to a method to enhance operation of a pipeline network or fluid transportation assembly. More particularly, this invention relates to a method and mechanism for managing the transportation of fluid commodities through one or more pipeline networks that interacts with a Supervisory Control and Data Acquisition (SCADA) unit to provide recommendations and effect remote automated controls for optimizing pipeline system (PLS) equipment settings.

BACKGROUND

This section is intended to introduce the reader to various aspects of the art, which may be associated with exemplary embodiments of the present invention, which are described and/or claimed below. This discussion is believed to be helpful in providing the reader with information to facilitate a better understanding of particular techniques of the present invention. Accordingly, it should be understood that these statements are to be read in this light, and not necessarily as admissions of prior art.

Pipeline networks or fluid transportation assemblies are utilized as an efficient method for transporting fluid commodities from one location to another. These fluid commodities may include liquid commodities, such as hydrocarbons, heavy crude oils, lighter crude oils and/or refined products, such as diesel, gasoline, aviation fuel and kerosene. In addition, the fluid commodities may include gaseous commodities or two-phase commodities, such as ethane, for example. The pipeline networks may include various tubular members or pipeline segments coupled together with equipment in pump stations. The pump stations typically include one or more pumps, sensors (e.g. meters, transmitters or gauges) and/or flow control devices, for example. The pipeline networks provide an efficient mechanism for transporting the fluid commodities from one location to another. For instance, the pipeline network may provide a flow path from an oilfield production tree to a surface facility and/or storage facility. In another example, a pipeline network may transport fluid commodities from a refinery and/or storage facility to distribution locations for customers.

Because of the distances between the commodity staging locations, such as oilfield production trees and distribution locations, the pipeline networks typically span long distances (e.g. Interstate and Intrastate). To manage the pipeline networks efficiently, pipeline networks are typically operated from a central control center manned on a 24-hour basis by operators who monitor various operational settings associated with the transport of fluid commodities through the pipeline network. The operational settings may include equipment settings (e.g. equipment status, etc.) and measured parameters (e.g. pressure, temperature, flow rate, etc.). These operational settings are transmitted from the remote field locations (e.g. pump stations) back to the control center. The operational settings are typically stored and displayed by a computer-based system, such as a supervisory control and data acquisition (SCADA) unit. The operator may issue operational instructions that are converted by the SCADA unit into equipment settings and transmitted to the equipment at the remote field locations. Through the SCADA unit, the operators in the control center are able to monitor and manage the flow of fluid commodities through the pipeline networks.

However, the equipment in the pipeline networks may be set to a variety of different configurations that result in pipeline flow rate regimes for a given set of operational settings or conditions. That is, many different configurations of equipment settings may provide a desired flow rate. Yet, only one of the configurations is more efficient or optimized in comparison to the others. The operation of the pipeline networks is further compounded because operators typically monitor and manage multiple pipeline networks. With operator-to-operator response variations based on experience, training and other operator specific factors, the pipeline networks are generally operated at less than optimal, or, in a non-optimized configuration. As a result, the pipeline networks may experience reduced flow rates, excessive power losses across pipelines' valves, less than optimal variable frequency drive (VFD) settings and over/under-injection of drag-reducing agents (DRAs).

Other techniques have a limited ability to establish and sustain optimum conditions in the pipeline networks. Typically, other techniques, such as hydraulic modeling, model fluid commodities through simulators prior to the transport of the fluid commodities through the pipeline network. These simulations utilize conservation of mass, energy and flow equations to represent the fluid commodities. However, these techniques do not use real-time operational settings, empirical data and/or historical data from previous operational settings to operate the pipeline networks. Further, these other techniques do not provide recommendations concurrently with the transport of fluid commodities through the pipeline network (e.g. an online real-time expert PL control system that is integral to console operations and the SCADA system).

Accordingly, for any desired pipeline flow rate and a given set of operational settings, a mechanism, such as an empirically based expert pipeline control system, for providing the operator with an efficient or optimal configuration is needed. This mechanism may also automatically update certain settings, such as DRA, VFD, draw valves, etc., to maintain efficient operation of the pipeline.

Other related material may be found in at least U.S. Pat. No. 5,504,693; U.S. Pat. No. 6,799,195; U.S. Pat. No. 6,851,444; U.S. Pat. No. 6,961,753; and U.S. Patent Pub. No. 2005/0166961 now U.S. Pat. No. 7,389,787. In addition, further additional related material may be found in Sybille Handley-Schachler et al., "New Mathematical Techniques for the Optimisation of Oil and Gas Production System," SPE European Petroleum Conference Oct. 24-25, 2000, Paper No. 65161-MA; Nestor Martinez-Romero et al., "Natural Gas Network Optimization and Sensibility Analysis," SPE International Petroleum Conference and Exhibition in Mexico, Feb. 10-12 2002, Paper No. 74384-MS; M. K. Lane et al., Special Session: Energy Bridge LNG Projects: Technology Innovation to Date and Into the Future," OTC 018397, 2006; and Mike Chunn et al. "Case History: New Gas Flow Computer Design Facilities Offshore Measurement in Gulf Coast Project," OTC 008798, 1998.

SUMMARY

In one embodiment, a method of managing transport of fluid commodities in a pipeline network is described. The method comprises obtaining a plurality of operational settings associated with a pipeline network as a fluid commodity is transported through the pipeline network; determining a recommendation concurrently with the transport of the fluid commodity to optimize at least one of the plurality of operational settings as the fluid commodity is transported through the pipeline network, wherein the recommendation comprises a plurality of equipment settings associated with equipment disposed along the pipeline network.

In another embodiment, a tangible medium for storing computer readable instructions to manage fluid commodities in a pipeline network is described. The tangible medium comprises a first set of instructions configured to obtain a plurality of operational settings associated with a pipeline network and store the plurality of operational settings. Further, the tangible medium comprises a second set of instructions configured to determine a recommendation concurrently with the transport of the fluid commodity based on at least one of the plurality of operational settings, wherein the recommendation comprises a plurality of equipment settings associated with equipment disposed along the pipeline network and provide the recommendation to the first set of instructions.

In yet another embodiment, a pipeline network is described. The pipeline network includes pipeline segments; equipment distributed along the pipeline segments and coupled to the pipeline segments; a plurality of sensors configured to obtain measured parameters from the pipeline segments and equipment; a pipeline management unit in communication with the equipment and the plurality of sensors; and a real-time optimizer in communication with the pipeline management unit. The equipment is associated with the transport of one or more fluid commodities through the pipeline segments. The pipeline management unit obtains equipment settings from the equipment, obtains the measured parameters from the plurality of sensors, communicates revised equipment settings to the equipment and receives operational instructions associated with the transport of the one or more fluid commodities through the pipeline segments. Also, the real-time optimizer is configured to provide a recommendation to the pipeline management unit, wherein the real-time optimizer determines the recommendation based on at least one of the equipment settings and the measured parameters with the recommendation comprising revised equipment settings for the equipment concurrently with the transport of the one or more fluid commodities through the pipeline segments.

In yet another alternative embodiment, a method of managing transport of fluid commodities in a pipeline network is described. The method comprising setting a flow rate of a fluid commodity transported through a pipeline network and determining an initial recommendation based on empirical data to achieve the flow rate, wherein the initial recommendation comprises a plurality of initial equipment settings associated with the transport of liquid commodities through the pipeline network. The method further comprising obtaining a plurality of operational settings associated with the pipeline network as the fluid commodity is transported through the pipeline network and determining a real-time recommendation concurrently with the transport of the fluid commodity to optimize at least one of the plurality of operational settings as the fluid commodity is transported through the pipeline network, wherein the real-time recommendation comprises a plurality of real-time equipment settings associated with equipment disposed along the pipeline network Further, in one or more of the embodiments above, various aspects may be adjusted. For instance, the plurality of equipment settings may be based on empirical data from previous experience with the transport of fluid commodities through the pipeline network and/or based on theoretical data from modeling of the transport of the fluid commodity through the pipeline network. The plurality of equipment settings may also comprise one or more drag-reducing agent settings or one or more variable frequency drive settings, which may be implemented without user intervention based on the recommendation.

BRIEF DESCRIPTION OF THE DRAWINGS

The foregoing and other advantages of the present technique may become apparent upon reading the following detailed description and upon reference to the drawings in which:

FIG. 8A-8L are exemplary charts relating to the efficiency of fluid flow through the pipeline network of FIG. 1 using the RTO in accordance with some aspects of the present techniques.

DETAILED DESCRIPTION

Figure 1:
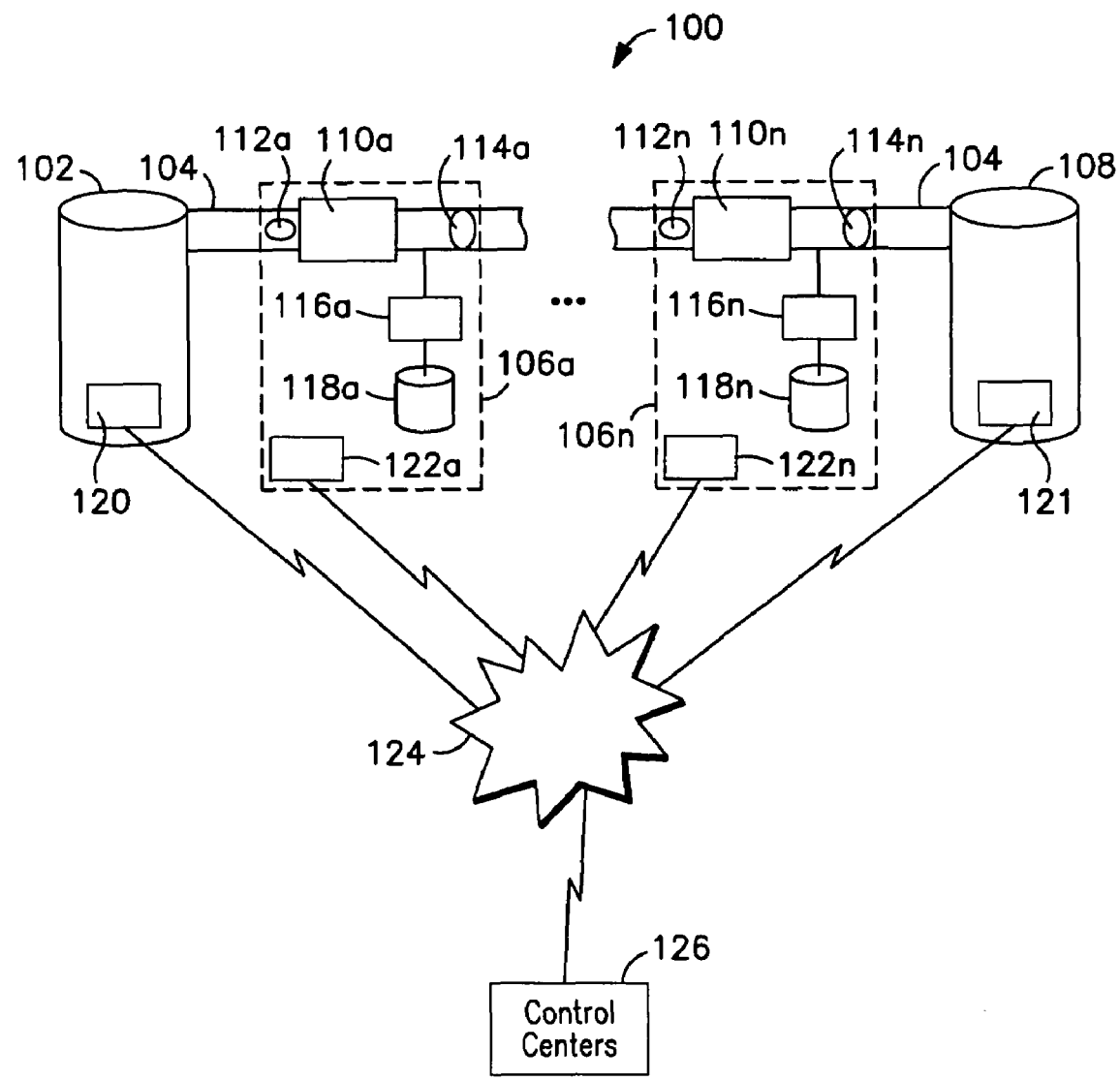
FIG. 1 is an exemplary pipeline network in accordance with certain aspects of the present techniques.

In the following detailed description and example, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

The present technique is directed to a method, assembly, and computer readable instructions for managing the transport of fluid commodities through one or more pipeline networks. In particular, a real-time optimizer (RTO) is utilized with a Supervisory Control and Data Acquisition (SCADA) unit to enhance fluid commodity or product transportation cost and revenue performance by managing the power usage, drag-reducing agent (DRA) settings, variable frequency drive settings and/or other adjustable equipment settings. The RTO is an expert algorithm based control system designed to optimize investments (e.g. energy, fuels, chemical additives, etc.) utilized to transport fluid commodities. To enhance fluid commodity transport, the RTO analyzes concurrent or real-time operational data from the SCADA unit along with product batch tracking where available. From the analysis, a recommendation is generated for equipment settings to optimize one or more equipment settings associated with the transport of a fluid commodity through the pipeline network for a given set of conditions (e.g. operational settings). The RTO provides this recommendation, which may be graphical, textual or a combination of both, via the SCADA unit to an operator of the pipeline network. In some situations, the adjustments to the equipment settings (e.g. DRA settings and VFD settings, for example) are performed automatically by the RTO (e.g. without user intervention). The status information and results from this automated adjustment may be provided to the operator as part of the recommendation or as an update.

Further, the recommendation provided by the RTO may be an initial recommendation of initial equipment settings prior to the transport of the fluid commodity or real-time recommendation of real-time equipment settings concurrently with the transport of fluid commodities through the pipeline network. As an example, the RTO may provide initial equipment settings for a fluid commodity based on empirical data from previous experience with the transport of fluid commodities through the pipeline network prior to the transport of the fluid commodity. The empirical data may be stored as pipeline transport algorithms, which each include equipment settings for efficient operation of the pipeline network for a given set of conditions (e.g. operational settings) based on empirical data. In addition, the RTO may provide real-time equipment settings for a fluid commodity based on empirical data and/or theoretical data concurrently with the transport of fluid commodities through the pipeline network. The theoretical data may be based on modeling of the transport of the fluid commodity through the pipeline network. As such, the RTO may provide a mechanism for managing the transport of fluid commodities to enhance pipeline operation and improve flow rates of fluid commodities.

As used herein, operational settings refer to equipment settings and measured parameters. The equipment settings are a collection of data relating to status settings, set-points and/or attributes for hardware components associated with the pipeline network. The equipment settings may include equipment status, opening or closing flow control devices, starting or stopping pumps, and/or starting or stopping DRA injectors to adjust the rate DRA is being injected into the pipeline segments, setting on VFDs and/or the like. Further, the measured parameters are a collection of data relating to readings from sensors, gauges or other devices associated with equipment and pipeline segments along the pipeline network. For example, the measured parameters may include pressures, temperatures, flow rates, and/or the like.

Turning now to the drawings, and referring initially to FIG. 1, an exemplary pipeline network 100 in accordance with some aspects of the present techniques is illustrated. In the exemplary pipeline network 100, a fluid, such as one or more fluid commodities, may be transported from a first facility 102 through various pipeline segments 104 and pump stations 106a-106n to a second facility 108. The first facility 102 may be, for example, an oilfield production tree, surface facility, oil sands plant or the like, while the second facility 108 may be a refinery, processing facility, distribution location or the like. The pipeline segments 104 may include tubular members utilized in the transport of fluid commodities between an origin and a destination to maintain the fluid commodity below a particular MOP (maximum operating pressure). It should be noted that n may be any integer number and that this embodiment is merely for exemplary purposes. For instance, other embodiments may include single or multiple product strip or injection points, as well as any number of intermediate pump stations.

The pump stations 106a-106n may include one or more pumps 110a-110n, one or more sensors 112a-112n, one or more flow control devices 114a-114n and/or one or more injectors 116a-116n for providing drag-reducing agents (DRAs) from the DRA tanks 118a-118n. The pumps 110a-110n may include one or more synchronous electrical motor pumps, variable frequency drive (VFD) pumps and/or the like. The flow control devices 114a-114n may be adjustable orifices or valves, such as computer-controlled variable orifices, that maintain the pressure within the pipeline segments 104 below a particular MOP or within a specific pressure level for a fluid commodity. The DRAs may include high molecular weight polymers, and water-in-oil emulsions with ultra-high molecular weight polymers, for example. The injectors 116a-116n are preferably located downstream of each pump 110a-110n because the DRAs shear and become less effective after they pass through pumps 110a-110n.

To manage and monitor the operation of the pipeline network 100, various processor based devices, such as remote devices 120, 121 and 122a-122n, may be utilized to collect and communicate data about operational settings, which include equipment settings (e.g. equipment status, etc.) and measured parameters (e.g. pressure, temperature, flow rate, etc.) of the pipeline network 100. The remote devices 120, 121 and 122a-122n may be programmable logic controllers (PLCs), loop controllers, flow computers, remote terminal units (RTUs), human machine interfaces (HMIs), servers, databases and/or a combination of these types of processor based systems. These remote devices 120, 121 and 122a-122n may also include monitors, keyboards, mouses and other user interfaces for interacting with an operator.

Each of the remote devices 120, 121 and 122a-122n may be located in one of the first facility 102, pump stations 106a-106n, and second facility 108 to collect the operational data, such as operational settings or telemetry data, from the equipment and/or meters associated with the pipeline network 100. As the control signals from the equipment (e.g. pump 110a-110n, flow control devices 114a-114n and/or injectors 116a-116n) and sensors 112a-112n may be limited by the distance that the control signals may be transmitted by a switch or transducer that is part of the equipment or meter, each of the remote devices 120, 121 and 122a-122n may operate as a central collection location for the data from one specific pump station 106a-106n or other pipeline facility. As an example, the operational settings may include data about the draw rate, pump status; DRA injector status; valve status; DRA injection rate; variable frequency drive settings; flow rate in the pipeline segments 104; height of fluid in the fluid commodity within tanks in the facilities 102 and 108 or DRA tanks 118a-118n; fluid temperature; pressure in the pipeline segments 104; density of the fluid commodity; and/or batch interface. The remote devices 120, 121 and 122a-122n may receive, process and store the various control signals in local memory. In this manner, the operational settings for each location may be efficiently managed for further distribution to the control center 126.

These remote devices 120, 121 and 122a-122n may interact with other devices that may be located at one or more control centers 126 via the network 124 to further process the operational data. The control centers 126 may include one or more facilities, which house various processor based devices having applications utilized to manage the equipment and monitor sensors or meters distributed along the pipeline network 100. An exemplary control center 126 is shown in greater detail below in FIG. 2. Because each of the remote devices 120, 121 and 122a-122n and the control centers 126 may be located in different geographic locations, such as different structures, cities, or countries, a network 124 may provide communication paths between the remote devices 120, 121 and 122a-122n and the control centers 126. The network 124, which may include different network devices (not shown), such as routers, switches, bridges, for example, may include one or more local area networks, wide area networks, server area networks, or metropolitan area networks, or combination of these different types of networks. The connectivity and use of the network 124 by the remote devices 120, 121 and 122a-122n and the devices within the control centers 126 is understood by those skilled in the art.

Figure 2:
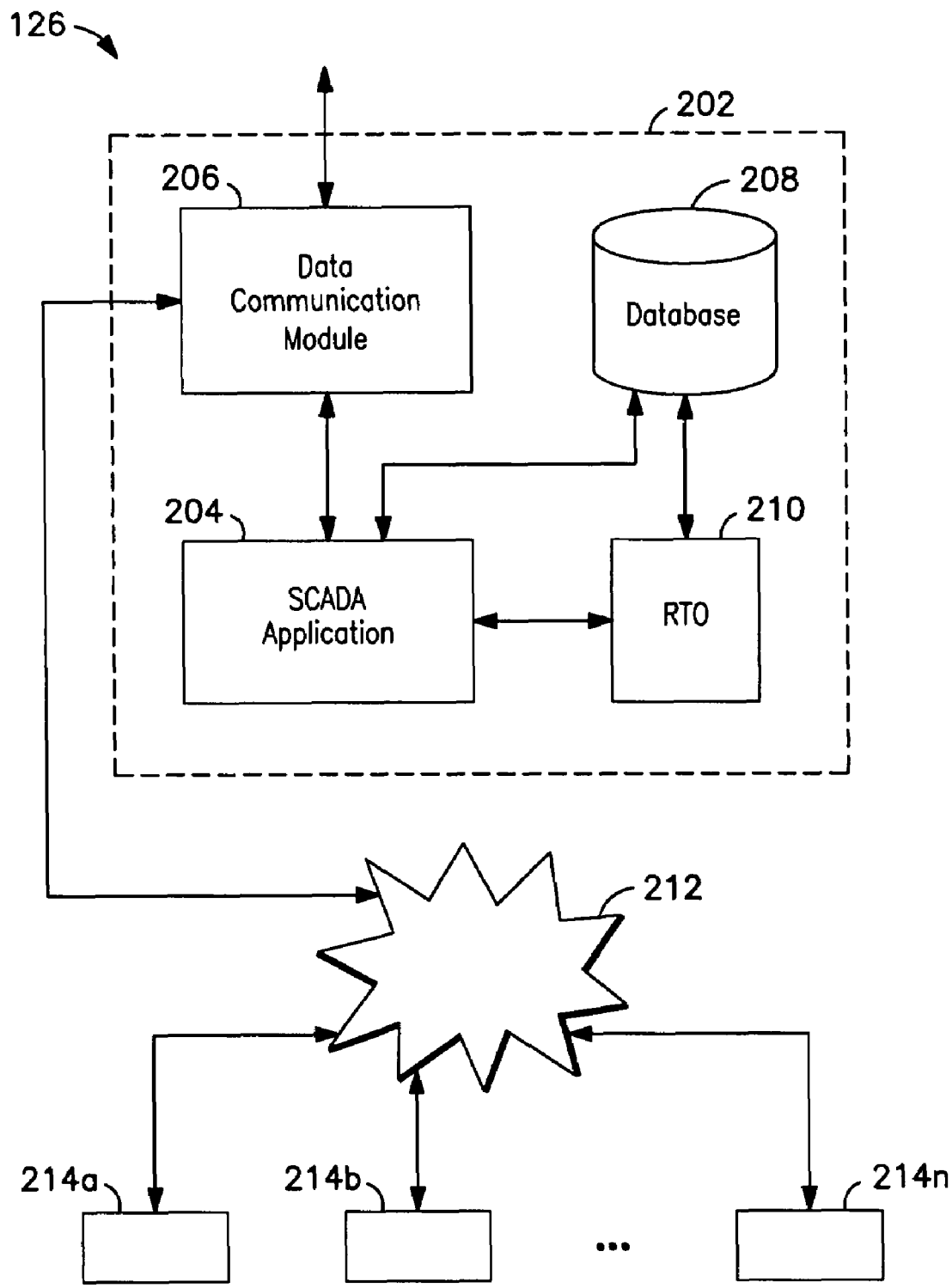
FIG. 2 is an exemplary embodiment of the control center of FIG. 1 in accordance with aspects of the present techniques.

FIG. 2 is an exemplary embodiment of the control center 126 of FIG. 1 in accordance with aspects of the present techniques. In FIG. 2, the control center 126, which is utilized to monitor and control the equipment and sensors in the pipeline network 100, includes a supervisory control and data acquisition (SCADA) unit 202 coupled to control devices 214a-214n via a network 212. The SCADA unit 202 provides a pipeline operator with access to operate the equipment in the pipeline network 100. Accordingly, FIG. 2 may be best understood by concurrently viewing FIG. 1. Further, while a single SCADA unit 202 is shown in FIG. 2, it should be appreciated that the control center 126 may include one or more local or regional SCADA units and one or more master SCADA units to manage the local SCADA units in other control center architectures.

The SCADA unit 202 may include various modules or components that perform specific functions for managing the transport of the fluid commodities. For instance, the SCADA unit 202 may include a SCADA application 204 that includes one or more software programs, routines, sets of instructions and/or code to manage the operation of the pipeline network 100. The SCADA application 204 may include Oasys DNA by Telvent, Inc.; Ranger by ABB, Inc.; Intellution by GE, Inc.; and/or UCOS by Control Systems International (CSI), Inc. In addition, the SCADA unit 202 may include a data communication module 206 and a database 208. The data communication module 206 may be a set of instructions that manage communications with other devices. For instance, the data communication module 206 may request the operational settings from the remote devices 120, 121 and 122a-122n at specific intervals or provide equipment settings to the devices 120, 121 and 122a-122n. The database 208 may be of any conventional type of computer readable storage device used for storing data, which may include hard disk drives, floppy disks, CD-ROMs and other optical media, magnetic tape, and the like, which stores the operational settings. The SCADA application 204 analyzes the operational settings, which may include converting the operational settings into a specific format for presentation to operators and/or identifying alarm conditions. The results of this analysis, along with the operational settings, are then stored in the database 208, as operational settings and operational reports. Then, the operational settings and operational reports may be synchronized to other databases of additional SCADA units in other locations.

In addition, the operational settings and operational reports may be presented to processor based devices, such as control devices 214a-214n, via the network 212 to provide an operator with data about the real-time operation of the pipeline network 100. The control devices 214a-214n may be computers, servers, databases and/or a combination of these types of processor based systems, which may also include display units (e.g. monitors or other visual displays), keyboards, mouses and other user interfaces for interacting with the operator. The network 212, which may include similar components to the network 124, may be utilized to provide communication paths between the control devices 214a-214n and the data communication module 206 in the SCADA unit 202. Typically, the network 212, which may include different networking devices (not shown), may include one or more local area networks or server area networks, but may also include wide area networks, metropolitan area networks, or combination of these different types of networks for certain operations. The connectivity and use of the network 212 by the control devices 214a-214n and the SCADA unit 202 is understood by those skilled in the art.

To operate the pipeline network 100, the operator enters operational instructions into one of the control devices 214a-214n. These operational instructions, which may include equipment settings or flow rates, for example, are communicated to SCADA application 204 through the data communication module 206 in the SCADA unit 202. Then, the SCADA unit 202 stores the operational instructions in the database 208 and may synchronize the operational instructions to the other SCADA units. The SCADA application 204 analyzes the operational instructions and converts the operational instructions into equipment settings, which may be in the same or a different format that is accepted by the remote devices 120, 121 and 122a-122n. That is, the SCADA application 204 converts the operational instructions from units of measurement for the operator into units of measurement for the remote devices 120, 121 and 122a-122n. The equipment settings are then transmitted to the remote devices 120, 121 and 122a-122n by the data communication module 206. Once received, the remote devices 120, 121 and 122a-122n acknowledge the equipment settings and transmit the equipment settings by providing the appropriate control signal to the equipment. The equipment settings (e.g. opening or closing flow control devices, starting or stopping pumps, and/or starting or stopping DRA injectors to adjust the rate DRA is being injected into the pipeline segments 104) are then executed by the respective equipment.

As may be appreciated, various factors influence the flow of the fluid commodities through the pipeline network 100, which may be fluid and/or equipment related. These factors may be monitored and managed by the operator in the control center 126 through the use of the remote devices 120, 121 and 122a-122n, SCADA unit 202 and control devices 214a-214n. For example, equipment related factors may include characteristics of the tubular component, pumps and/or supplementary equipment related to the movement of fluid commodities through the pipeline network. Also, the fluid related factors may include characteristics of the fluid that influence flow or flow rate such as density and viscosity. Other fluid properties or characteristics may also influence the flow of fluids in a pipeline network. In particular, liquids flowing through a tubular member typically flow faster in the center of the tubular member than liquids flowing near surfaces of the tubular member. Flow in the tubular member may generally be characterized as laminar or turbulent. Flow near the surface of the tubular member is in laminar flow and at high flow rates it becomes more turbulent as you move towards the center of the flow. The liquids flowing through the tubular member become turbulent with eddies created near the surface of the tubular member interfering with flow through the center of the tubular member (i.e. turbulent flow). With turbulent flow, energy is lost as a result of the eddy-induced friction. As such, laminar flow is more energy efficient than turbulent flow for transport operations in a pipeline system (PLS).

Further, with regard to density, fluid commodities with a higher density typically involve a greater differential pressure to flow at a particular flow rate than fluid commodities having a lighter density. Also, with regard to viscosity, fluid commodities with a higher viscosity typically involve a greater differential pressure to flow at a particular flow rate than fluids have a lower viscosity. Because of the high capital cost of constructing and operating the pipeline network 100, different commodities are typically transported in the same pipeline network 100. For instance, a certain volume of a first fluid commodity may be placed into the pipeline network 100, followed by a volume of a second fluid commodity having a different density or viscosity than the first fluid commodity. These volumes, which are referred to as batches, may result in volumes of differing density or viscosity liquids occurring at different locations within the pipeline network 100. For example, a less dense fluid commodity positioned behind a denser fluid commodity positioned in front may cause pressure changes throughout the pipeline network resulting in changes to the flow rate due to differential pressure alterations.

Further, some other pipeline networks may also include multiple segments interconnected by intermediate booster stations. In this type of pipeline network, fluid dynamics may cause surges and differing axial velocities in the system due to operational changes. During this process unsteady state flow is occurring in the pipeline network. The pressure surges related to these changes reduces transportation efficiency. Therefore, establishing and maintaining consistent steady state axial fluid velocities along the pipeline network's length may enhance operation of the pipeline network.

To manage the flow of the fluid commodities, drag reducing agents (DRAs) may be introduced into fluid commodities flowing through pipeline segments 104 at the pump stations 106a-106n via the injectors 116a-116n that are coupled to DRA tanks 118a-118n. DRAs may be utilized to reduce the fluid drag within the tubular member. As a result, DRAs may potentially increase the fluid flow capability of the pipeline network or increase energy efficiency at existing flow rates. In this manner, the DRAs may be utilized to maintain the optimal.

In addition, because the energy to move the fluid commodity through the pipeline segments 104 is provided by the pump stations 106a-106n at various locations along its length, the pumps 110a-110n may be adjusted to further refine the operation of the pipeline network 100. Typically, pumps 110a-110n that move the fluid commodity through the pipeline segments 104 are distributed along the length of the pipeline network 100. The pumps 110a-110n are often driven by synchronous electrical motors, which provide a limited amount of control over the energy provided to the fluid commodity passing through the pump. For instance, if the pumps 110a-110n are activated, they operate at a predetermined speed to increase the pressure within the pipeline segment 104 to a predetermined level. To operate the pipeline at a point different than the predetermined level of the pumps, a computer-controlled variable orifice can be used to adjust the energy output for flow. As such, the energy expended in the throttling process is wasted (e.g. lost as friction and turbulence in the control section of the pump unit and intra-station piping) because the energy is not directed as an axial force through the pipeline to transport the fluid commodity. To provide finer control of the energy input, multiple pumps of smaller size may be co-located at one or more pump stations 106a-106n. With multiple pumps at each pump station, one or more pumps may be operational, while others are inactive to provide a more specific amount of energy input into the fluid commodity. Also, as another mechanism for adjusting the energy input, pumps 110a-110n may include variable frequency drives (VFDs) to vary the rotational speed of the pumps 110a-110n, which provides a range of discharge pressures to be produced at the pump outlet. That is, with variable frequency drives, the operation of the pumps 110a-110n may be managed at smaller increments to control specific amounts of energy input into the fluid commodity. The VFD pumps may reduce or avoid loss of energy by tuning the rotational speed of the pumps to produce a discharge pressure that is acceptable to the downstream piping. As such, electrical energy provided to the pipeline network is more efficient in transporting the fluid commodity.

Further, as another mechanism for managing the flow of fluid commodities through the pipeline network 100, flow control devices 114a-114n may include computer-controlled variable orifices that are located downstream of pumps 110a-110n. If the pressure created by the pumps 110a-110n exceeds the maximum allowable pressure, such as the MOP, the computer-controlled variable orifices may close or adjust until the pressure on the downstream-side of the computer-controlled variable orifice matches the maximum allowable pressure. This type of flow management mechanism is referred to as throttling, and it is typically undesirable, as it is an inefficient use of power.

The efficiency of the flow is also limited by the operational costs and operational constraints. As an example of the operational costs, the operator may manage the fluid commodities to reduce electrical energy costs during peak and off-peak periods of the day. Also, the operator may balance the use of electrical energy with the use of DRAs, depending on the comparative cost of these two inputs, to manage the fluid commodities. As an example of the operational constraints, the pipeline network 100 may be operated in a manner to prevent hydraulic over-pressurization events to reduce or prevent certain events from occurring. By managing the operational constraints, unfavorable pipeline events may be reduced, costs for pipeline examinations (e.g. aviation line flying) or tests of the pipeline network 100 may be reduced, costly downtime for fluid transportation may be avoided, and/or the reliability of pipeline's operation is increased with more controlled and predictable operation of the pipeline network 100. As such, the operational constraints and operational costs may be additional factors evaluated in operating the pipeline network 100.

Considering these factors, a set of operational settings for a specific configuration or pipeline gear may exist for a desired flow rate through the pipeline network 100. For instance, operators may monitor operational settings, which include equipment settings (e.g. equipment status, etc.) and measured parameters (e.g. pressure, temperature, flow rate, etc.), for a long distance pipeline network operated from a central control center. Based on the equipment settings and measured parameters, the operator may adjust one or more of the equipment settings for the pumps 110a-110n, flow control devices 114a-114n, and injectors 116a-116n to refine the fluid flow through the pipeline network. In this manner, the operators may manage the flow of the fluid commodities through the pipeline network 100 by adjusting the equipment settings.

Typically, operators rely on years of experience and training, recommendations from other personnel, and written operating procedures to determine how to respond to operational settings and manage the pipeline network 100 at a desired flow rate. These experience-based methods are usually useful in providing the desired flow rates, but may not include the most efficient equipment settings for the operational settings or provide guidance for real-time events. As a result, because there are many different potential equipment settings and the operator may be responsible for many different pipeline networks, the operator often selects equipment settings that are non-optimum for each of the pipeline networks. Further, as time elapses, the hydraulics in the pipeline network may modify with ambient atmospheric conditions, fluid commodity batch (assay) type, special batch location, etc., causing the pipeline configuration and hydraulic state to stray from optimal operation. That is, despite detailed procedures, extensive training, and years of experience, different operators react to the same operational settings in different ways, often operating equipment inefficiently to achieve the desired flow rate.

While various applications have evolved to further analyze the operational settings received from the equipment and sensors in a pipeline network, these applications typically obtain operational settings and operational reports from the SCADA unit, perform the analysis, and then write the results of the analysis into the database. An example of this type of application is batch tracking, where the results of the analysis are the current locations of the various fluid commodities within the pipeline network. Batch tracking is a hydraulic model based application that identifies commodity type, location, and size as the various fluid types migrate the pipeline network's length(s). Other applications, such as hydraulic modeling, model the flow of fluid commodities through mass, energy and flow equations prior to transporting the fluid commodities through the pipeline networks (e.g. offline pipeline modeling/optimization). As such, each of these applications do not adjust the fluid commodities in real-time (e.g. do not perform on-line pipeline operation/optimization) to maintain optimal fluid flow.

To provide real-time recommendations, a real-time optimizer (RTO) 210 may be utilized. The RTO 210 is a mechanism for analyzing operational settings within a SCADA unit 202 to enhance the operation of the pipeline network 100 in real-time and concurrently with the transport of fluid commodities. The RTO 210 may be implemented as one or more software programs, routines, software packages, and/or computer readable instructions that interact with the SCADA unit 202, or specifically the SCADA application 204 and database 208. The RTO 210 may also be written in any suitable computer programming language, such as C, C++, Java, Fortran, Pascal scripts and the like. As such, through the RTO 210, additional functionality may be provided to the operator in real-time to optimize the use of power, VFD and DRA for fluid commodities in the pipeline network 100.

In particular, the RTO 210 may provide an operator of the control devices 214a-214n with recommendations for configurations of equipment settings that are more efficient than other possible configurations. The gears may include equipment settings based on empirical data from previous fluid commodities or may include theoretical data from a model of the pipeline network. The empirical data is equipment settings based upon experience or observations without the use of scientific theory or models). The RTO configuration data is generated through collecting and analyzing data associated with peak pipeline network operating performances (empirical best performances), and then configuring the RTO to articulate the high performance operation when the pipeline network is operating in the analyzed mode(s). The theoretical data may include common hydraulic modeling results, for example. Regardless, the RTO 210 may provide recommendations concurrently with the transport of fluid commodities in the pipeline network to further enhance the operation of the pipeline network. In this manner, the RTO 210 may guide the operator or automatically adjust the pipeline equipment to manage the pipeline network 100 in a consistent and repeatable manner each time and during the transport of the fluid commodities to enhance efficiency and pipeline operational reliability.

To provide the gears, the RTO 210 may search a database within the RTO 210 or the database 208 for the appropriate pipeline transport algorithms. The pipeline transport algorithms may include various equipment settings or fields, such as pump configurations, DRA configurations, strip/draw/injection configurations, VFD configurations, and/or other equipment setting configurations, for example. As it can be appreciated, the pipeline transport algorithms may vary depending on the different operational settings associated with different fluid commodities and pipeline network 100. The operational settings may include desired flow rate, assay characteristics, pipeline dynamics, batch size, batch locations (e.g. location of different fluid commodities in the pipeline network) and/or batch type, and/or power contract rate schedule (e.g. rates for time of day, day of the week, holiday). Based on these operational settings, the pipeline transport algorithms are provided to the operator through the SCADA application 204. For instance, the pipeline transport algorithms may be graphically displayed to the operator through one of the control devices 214a-214n. One embodiment of the configuration or gear selection process of the RTO 210 is discussed further below in FIG. 4.

Further, the RTO 210 may adjust certain equipment settings automatically or without user intervention. For instance, the RTO 210 may adjust the DRA tuning and/or VFD tuning for the pipeline network 100 to further enhance operations. The tuning (e.g. DRA flow rate at different injection points or VFD speed settings) may be adjusted to optimize energy usage, material consumption and maximize flow rate within the pipeline network 100. These tuning adjustments may be initiated by the operator or may be automatically performed within an operator-specified rate band or gear. The RTO 210 may again utilize the pipeline transport algorithm, stored or estimated operational settings (e.g. pressure, flow, and product batch location parameters) and statistical process control techniques to calculate changes in the flow of fluid commodities. For example, with these calculated changes, the RTO 210 may manage the injection of DRA automatically (e.g. without user intervention) or simply provide the operational settings for DRA tuning in the RTO recommendations to the operator through the SCADA application 204. One embodiment of the DRA tuning process of the RTO 210 is discussed further in FIG. 5, while one embodiment of the VFD tuning process of the RTO 210 is discussed further in FIG. 6.

Moreover, the RTO 210 may also provide a mechanism for tracking and maintaining optimized fluid flow in the pipeline network 100 concurrently with the transport of fluid commodities through the pipeline network 100. For instance, the RTO 210 may track changes in the configuration and compare the changes to the pre-determined pipeline transport algorithms. In this manner, operational settings for a specific configuration (e.g. controlled DRA settings or equipment setting variations) may be stored to further optimize the pipeline transport algorithms. Also, the RTO 210 may maintain the quality of fluid commodities by protecting against cross-contamination or injection of DRA into incompatible fluid commodities. Accordingly, the RTO 210 may protect against commodity contamination by cross-examining the status of DRA injectors and the relative location of protected batches or protected commodities. If a protected commodity that is incompatible with DRA is within a certain range of a DRA injector, the RTO 210 may alarm the operator of the condition by an audible or visual alarm. If the protected commodity reaches a predetermined failsafe point prior to the operators taking appropriate action (e.g. turning off the DRA injector), the RTO 210 may automatically disable the DRA injection to protect product quality.

To operate, gears, which are associated with various operational instructions that correspond to equipment settings, are selected by an operator and provided to the SCADA unit 202. The gears are verified by the SCADA unit 202 to ensure that the resulting equipment settings are valid and comply with operational constraints of the pipeline network. The operational instructions may be converted into equipment settings if the operational instructions and equipment settings are in different formats. Once verified, the operational settings are provided to the remote devices 120, 121 and 122a-122n and respective equipment to execute the equipment settings. With the operational settings, the RTO 210 may enhance the operations of the pipeline network 100 by determining efficient gears that adjust the fluid flow to achieve a desired flow rate through the pipeline segments 104 with real-time data (e.g. concurrent operational data with fluid flow of the fluid commodities). The use of the RTO 210 is explained further in FIG. 3.

Figure 3:
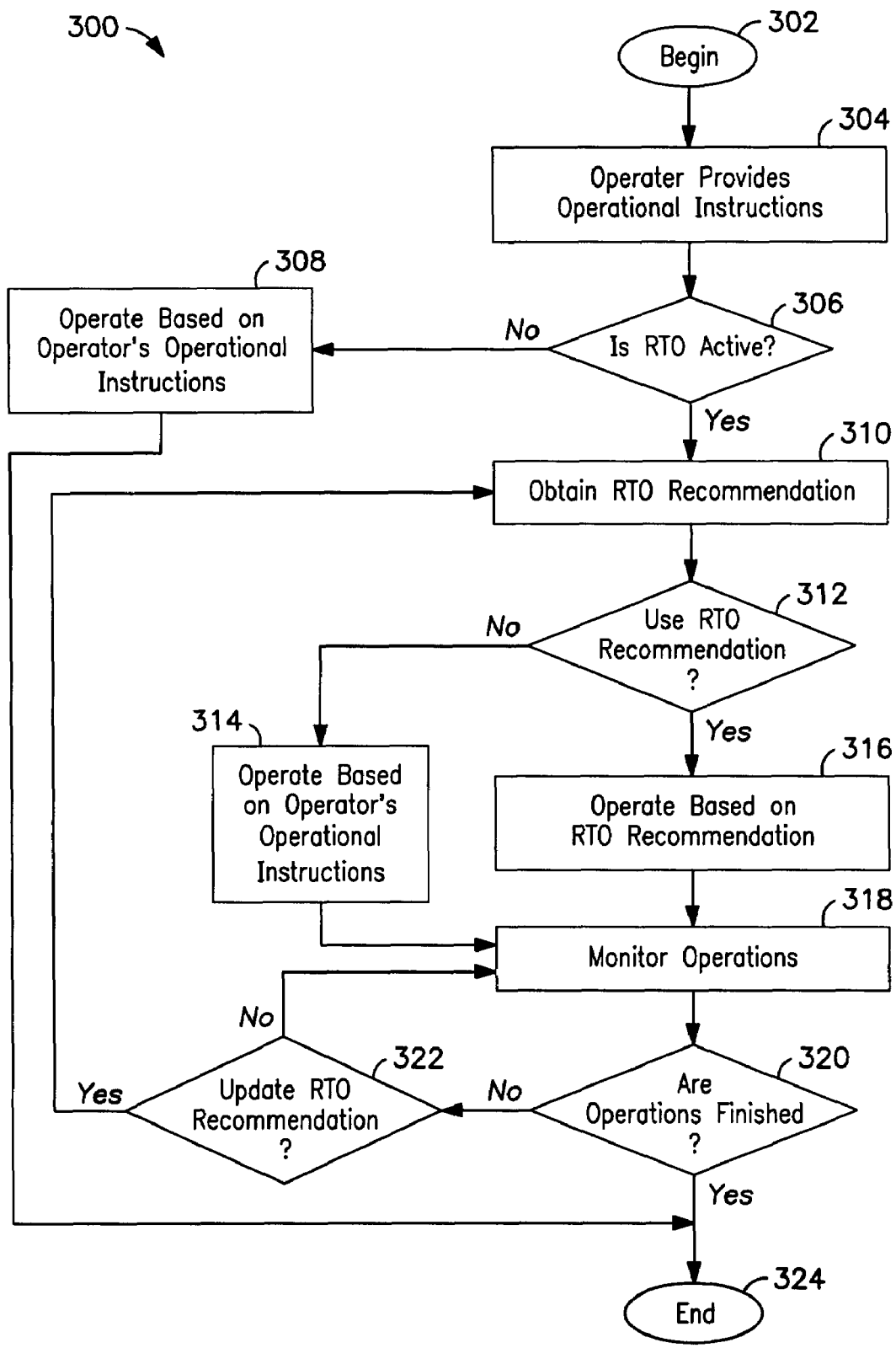
FIG. 3 is an exemplary flow chart of one use of the real-time optimizer (RTO) of FIG. 2 in accordance with some aspects of the present techniques.

FIG. 3 is an exemplary flow chart of the use of the RTO 210 in the pipeline network 100 in accordance with aspects of the present techniques. In FIG. 3, an exemplary flow diagram, which may be referred to by reference numeral 300, describes the use of the RTO 210 with the SCADA unit 202 of FIG. 2. Accordingly, FIG. 3 may be best understood by concurrently viewing FIGS. 1 and 2. An operator of the SCADA unit 202 may utilize the RTO 210 to provide efficient configurations for the pipeline network 100, as described below.

The flow chart begins at block 302. At block 304, the operator provides operational instructions for the pipeline network 100. The operator may provide the operational instructions (e.g. provide a flow rate or other suitable setting for the operation of the pipeline) by entering the operational instructions via one of the control devices 214a-214n. These operational instructions may be stored by the SCADA application 204 in the database 208. At block 306, a determination is made whether the RTO 210 is active. If the RTO is not active, then the pipeline network is operated based on the operational instructions, which are converted into operational settings, as shown in block 308.

However, if the RTO 210 is active, a RTO recommendation may be provided in block 310. The RTO recommendation may be presented via a graphical user interface to a display unit for the operator. The graphical user interface may be a window provided to the operators via the SCADA unit 202, which includes graphical or textual data, a report or any other suitable data. An example of the graphical user interface is discussed further below in FIGS. 7A-7C. Then, a determination is made whether to use the RTO recommendation, as shown in block 312. If the RTO recommendation is not utilized, the pipeline network 100 is operated based on the operational instructions provided by the operator, as shown in block 314. These operational instructions may include at least some of the operational settings in the RTO recommendation. However, if the RTO recommendation is utilized, the pipeline network 100 is operated based upon the RTO recommendation, as shown in block 316. Operating the pipeline network 100 based on the RTO recommendation may include selecting an icon to have the SCADA application 204 convert the RTO recommendation into equipment settings for one or more configurations. Regardless, the pipeline operations may be monitored in block 318. The monitoring of the pipeline operations may include the collection of additional operational settings from the remote devices 120, 121 and 122a-122n by the SCADA unit 202.

After monitoring the pipeline network 100, a determination is made whether the pipeline operations are finished, as shown in block 320. This determination may be made within a predetermined period (e.g. specific time interval), based upon a specific event or after specific operations are completed. For instance, the determination whether operations are finished may be performed every 60 seconds, after collection of data from each of the remote devices 120, 121 and 122a-122n by the SCADA unit 202 and/or after measured parameters, such as pressure within one of the pipeline segments 104, exceeds a certain level. If the operations of the pipeline network 100 are not finished, a determination is made whether the RTO recommendation should be updated, as shown in block 322. If the RTO recommendation is to be updated, then an RTO recommendation is obtained in block 310. If an RTO recommendation is not to be updated, the pipeline operations may be monitored again in block 318. For example, the RTO recommendation may not be updated if the operational settings have not varied more than a specific amount from the previous RTO recommendation. However, if the operations are finished, the process may end at block 324.

Beneficially, by utilizing the RTO 210 the pipeline network 100 may be operated in a consistent and repeatable manner regardless of the operators. For instance, the RTO 210 may provide gears that reduce throttling events, maintain suction pressure health, document and maintain optimized gears from historical operations, and provide VFD and DRA recommendations to further enhance flow rate. Accordingly, the use of the RTO may increase pipeline reliability because it minimizes pipeline equipment modulation, equipment fatigue and wear effects generated from frequent equipment cycling and exercise.

Figure 4:
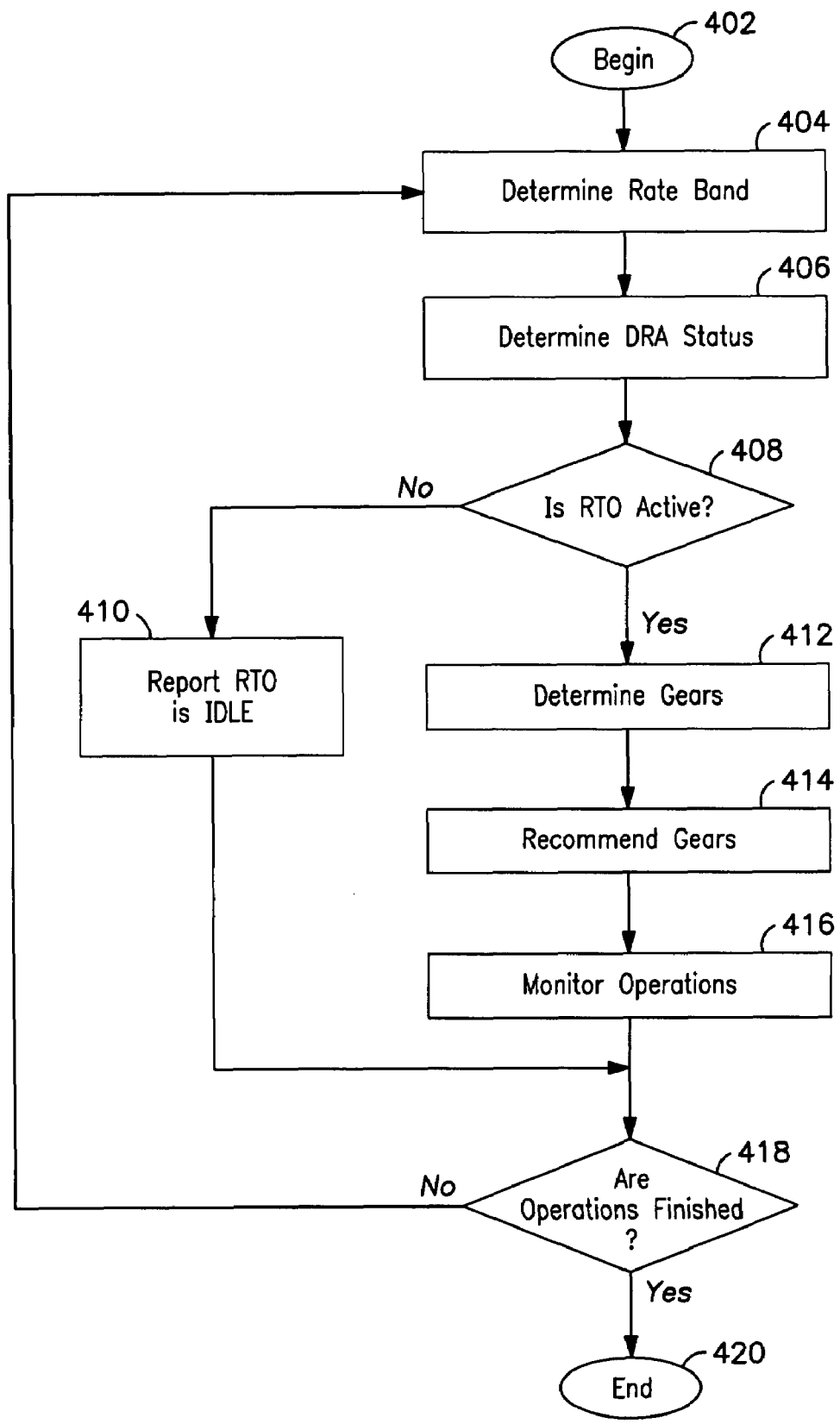
FIG. 4 is an exemplary flow chart of one configuration or gear selection in the RTO of FIG. 2 in accordance with some aspects of the present techniques.

FIG. 4 is an exemplary flow chart of the configuration or gear selection in the RTO 210 of FIG. 2 in accordance with aspects of the present techniques. In FIG. 4, an exemplary flow diagram, which may be referred to by reference numeral 400, describes the use of the operational settings and operational instructions by the RTO 210 to select a configuration. Accordingly, FIG. 4 may be best understood by concurrently viewing FIGS. 1-3. As a specific example of the gear selection process, pseudo code is provided in Appendix A and referenced for specific portions of the discussion below. Specifically, one embodiment of exemplary pseudo code for the gear selection process is listed below in Appendix A under Gear Selection.

The flow chart begins at block 402. At block 404, the RTO 210 determines the rate band. The rate band may include different ranges of flow rates for the mainline (main pipeline throughput path) and any strip(s) (intermediate lateral delivery point(s)). The rate bands may be determined through empirically proven highly efficient equipment settings for configurations that produce one or more repeatable flow rate regimes for fluid commodities. The rate band may be determined from the operational instructions provided by the operator selecting a specific rate band. Exemplary pseudo code for one embodiment of determining the rate band is listed below in Appendix A under "Rate Bands." Then, the RTO 210 determines the DRA skid health in block 406. The DRA skid health, which is whether the DRA skid is tracking its set-points or equipment settings within acceptable thresholds, may involve verifying DRA flow rates and levels at each pump station 106a-106n from operational settings, determining locations with acceptable and inadequate DRA flow rates or amounts, determining status of injectors' 116a-116n from operational settings, determining batch location (e.g. leading and trailing edges and volume), fluid commodities compatibility with DRAs and/or determining the location and amount of DRAs. Exemplary pseudo code for one embodiment of determining the DRA skid health is listed below in Appendix A under "DRA Skid Health" and "Determine if a no DRA batch is at the station."

At block 408, a determination is made whether the RTO 210 is active. The RTO status may include verifying that the operational status of the pipeline network 100, verify that the operational settings in the SCADA database 208 are acceptable and determining whether the operator has activated an interface for the RTO 210 to provide RTO recommendations to the operator. If the RTO 210 is inactive (e.g. pipeline network is not operational, operational settings in the SCADA database 208 are not acceptable, or RTO 210 is disabled by the operator), the RTO 210 reports that the RTO 210 is idle in block 410. This report may be transmitted to the operator and/or stored in the database. Exemplary pseudo code for one embodiment of reporting the idle status of the RTO is listed below in Appendix A under "Report RTO as Idle."

However, if the RTO 210 is active (e.g. pipeline network is operational, operational settings in the SCADA database 208 are acceptable and RTO 210 enabled by operator), the RTO 210 determines one or more gears, as shown in block 412. To find gears, the RTO 210 may verify if the current gear is a step in a series of gears, verify measured parameters, such as pressures in the pipeline network 100 from the operational settings, validate gears, recommend gears and/or provide the status of gear searches. The validation of gears may include collecting data about the fluid commodities, such as batch location, special fluid commodities, leading and trailing edges of the fluid commodities, volume of the fluid commodities, band rates and/or time and date. The recommendation of gears may include determining status of pumps from operational settings and/or determining measured parameters (e.g. pressures, commodity flow rates, etc.), for example. Exemplary pseudo code for one embodiment of determining if the RTO is active is listed below in Appendix A under "Find the gear," "Recommend gear" and "Validate gear."

Once the gears are determined, the gears may be recommended in block 414. Recommending gears may include determining status of pumps from operational settings and/or determining measured parameters (e.g. pressures, commodity flow rates, etc.). The recommendation of gears may also include determining if the pipeline network 100 is operating in gear to report the status as being an initial use of gear, gear-seeking mode, in gear or out of gear. Exemplary pseudo code for one embodiment of determining if the RTO is active is listed below in Appendix A under "Gear Selection" and "Recommend gear." Then, the RTO 416 may monitor operations of the pipeline network 100, as discussed above in block 318. At block 418, a determination is made whether pipeline operations are finished, which is similar to the discussion of block 320. As noted above, this determination may be made within a predetermined period (e.g. specific time interval), based upon a specific event or after specific operations are completed. For instance, as noted in Appendix A, the determination whether pipeline operations are finished may be performed every 60 seconds or if a rate band changes for the pipeline network, as indicated by the operational settings. If the pipeline operations are not finished, the rate band is determined in block 404. However, if the pipeline operations are finished, the process may end at block 420.

To fine tune pressure or hydraulic profiles within the pipeline network 100, the RTO 210 may fine tune pressure profiles through DRA tuning and/or VFD tuning. For instance, when a pipeline network 100 is operating either in gear (i.e. when operating at the selected configuration) or in gear-seeking mode (i.e. when operating in one of multiple configurations to reach a specific gear), it is known that a particular pressure profile on the pipeline network 100 is optimal. With the pumps $110a$-$110n$ operating, one mechanism to adjust pressures in the pipeline network to obtain the optimal pressure profile is to vary the amount of DRA injected at the pump stations $106a$-$106n$ by the injectors $116a$-$116n$, while another mechanism is to adjust the speed of pumps having a VFD. For example, the RTO 210 may recommend changes to the DRA injection rates to the operator or may automatically adjust the DRA injection rates at pump stations $106a$-$106n$ by interacting with the SCADA application 204 to change the DRA injection rate. That is, the RTO 210 may manage the fine tuning of pressure profiles for the pipeline network 100 by writing equipment settings in a recommendation into the database 208 and to have the SCADA application 204 transmit the appropriate equipment settings to achieve the change in the DRA injection rate and/or VFD settings, as appropriate.

For DRA tuning, the appropriate DRA injection rate adjustments are determined through a two part DRA tuning algorithm that includes a raw DRA rate recommendation and normalization of the DRA rate recommendation. In the raw DRA rate recommendation portion, the RTO 210 may determine what changes are desired in each pump station's suction pressure because one or more fluid commodities enter a pump station at a certain pressure (e.g. a suction pressure). In many situations, it is not desirable or possible to make adjustments in the operational settings to provide suction pressures for the desired or optimal pressure profile. Accordingly, when the average actual suction pressure differs from the average optimal suction pressure, the RTO 210 utilizes a configurable factor to determine how much adjustment in the suction pressure is possible. In this manner, the DRA settings are adjusted to match the differential pressure pattern of the optimal suction pressure, in preference to pursuing adjustments to obtain the optimal average pressure across the pipeline network 100.

Then, the RTO 210 compares local throttling and desired changes in the local and downstream pump station suction pressures. Based on the desired changes, the DRA tuning algorithm computes a recommended change in the operational settings for each of the injectors $116a$-$116n$. Cross-purposes, such as when a desired downstream request is to increase DRA, while a desired local request is to decrease DRA, tend to counteract each other. That is, the larger DRA request may be provided at a reduced rate by the countering DRA nodal requests. These DRA adjustments in operational settings are also reviewed to ensure that the recommended adjustment does not cause problems by dropping a suction pressure below configured levels or elevating downstream pressures above the maximum allowable control pressure.

In the normalization of the DRA rate recommendation portion, the raw rate recommendation is normalized to provide a constant amount of DRA. Generally, the total volume of DRA injected into the pipeline network 100 is maintained at a constant level. That is, unless specifically configured otherwise for a gear, the raw recommendation is normalized to maintain a fixed amount of DRA entering the pipeline network 100. As a result, only the pump stations $106a$-$106n$ where DRA is entering the pipeline network 100 are the operational settings that are changed.

Further, RTO 210 may also monitor the quality of fluid commodity through automatic pipeline monitoring via sensors $112a$-$112n$ of real-time DRA utilization through protective code routines in the RTO 210 that evaluate DRA injection rates as compared with pipeline product quality treatment limits. Accordingly, the DRA skid behaviour at each pump station 106a-106n is also monitored for proper control of actual DRA injection rate versus the intended equipment setting. In this manner, the RTO 210 informs the operator via the SCADA application 204 of the type, location, and severity of DRA injection problems. The DRA tuning process is further described in FIG. 5.

Figure 5:
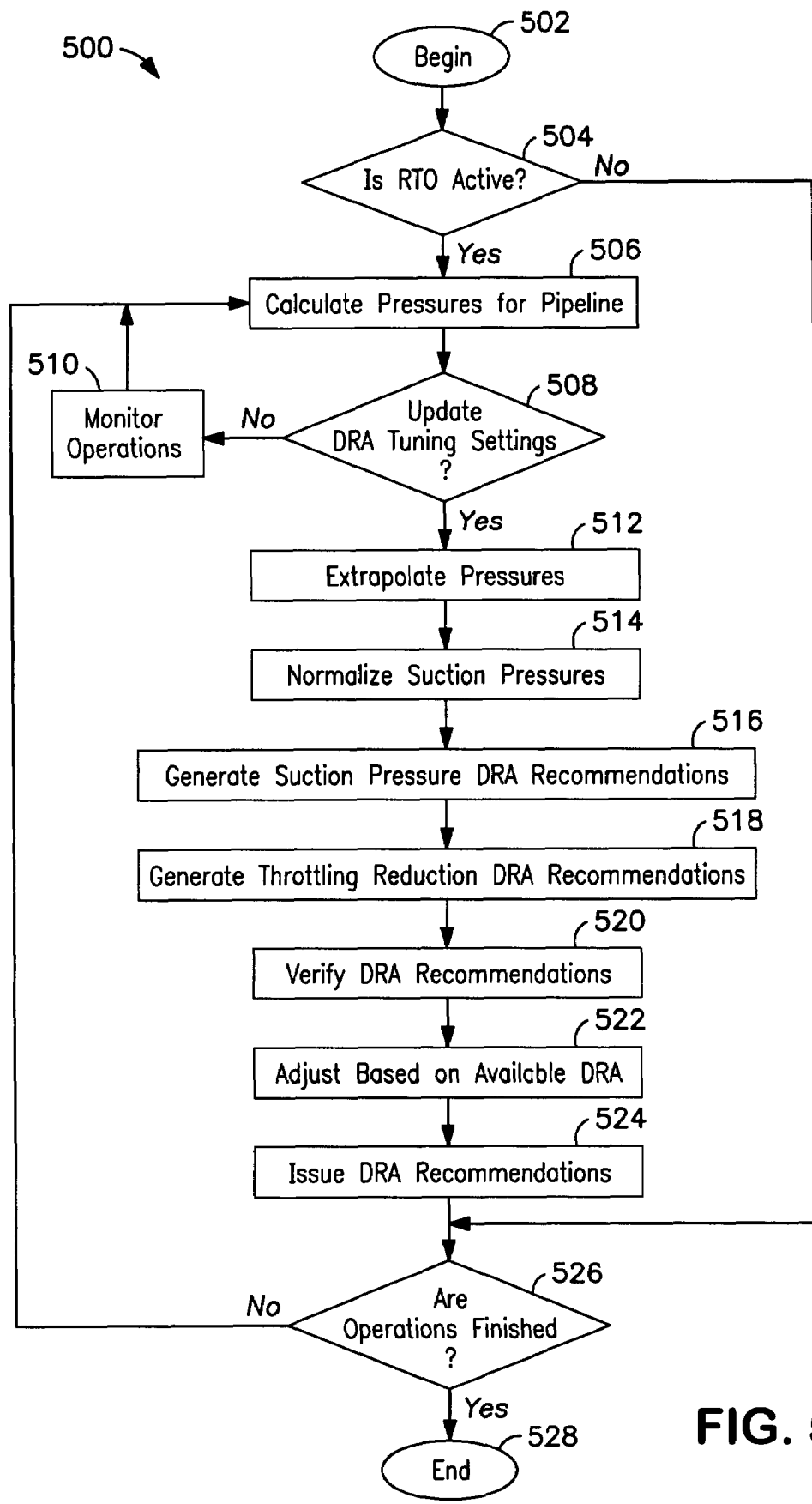
FIG. 5 is an exemplary flow chart of the DRA tuning in the RTO of FIG. 2 in accordance with some aspects of the present techniques.

FIG. 5 is an exemplary flow chart of the DRA tuning in the RTO 210 of FIG. 2 in accordance with some aspects of the present techniques. In FIG. 5, an exemplary flow diagram, which may be referred to by reference numeral 500, describes the use of the RTO 210 to fine tune pressure profiles within the pipeline network 100 by adjusting DRA settings. Accordingly, FIG. 5 may be best understood by concurrently viewing FIGS. 1-4. As specific example of the DRA tuning process, pseudo code is provided in Appendix B and referenced for specific sections of the discussion below for exemplary purposes. Specifically, one embodiment of exemplary pseudo code for the DRA tuning process is listed below in Appendix B under DRA Tuning.

The flow chart begins at block 502. At block 504, a determination is made whether the RTO 210 is active. This determination may be performed similar to the discussion of block 408 in FIG. 4. If the RTO 210 is inactive, then a determination about whether operations are finished is made in block 526. The determination about whether operations are finished is similar to the discussion of block 320. As noted above, this determination may be made within a predetermined period (e.g. specific time interval of 60 seconds, for example), based upon a specific event or after specific operations are completed. However, if the RTO 210 is active, then the RTO 210 may calculate pressures for the pipeline network 100, as shown in block 506. The calculation of pressures may involve obtaining pressures, such as suction pressures and discharge pressures, at different locations within the pipeline network 100 and comparing these pressures to certain pressure limits for the gear or pipeline network 100. Exemplary pseudo code for one embodiment of calculating the pressures is listed below in Appendix B under "Calculate Suction Pressure Delta & Discharge Pressure Delta."

Then, the RTO 210 determines whether to update the DRA settings, as shown in block 508. This determination may be performed similar to the discussion of block 408 in FIG. 4. For instance, if the pipeline network 100 is out of gear or a counter has reached zero, then the RTO 210 may provide an updated DRA settings via the RTO recommendation or may automatically perform the adjustment in some situations. If the DRA settings are not to be updated, the RTO 210 may continue to monitor pipeline operations in block 510, which is similar to block 416 of FIG. 4. However, if the DRA settings are to be updated, the RTO 210 may generate an updated recommendation, as discussed in blocks 512-524. Exemplary pseudo code for one embodiment of generating an updated recommendation is listed below in Appendix B under "Generate New Recommendation."

To begin the update recommendation process, pressures are extrapolated in block 512. The extrapolation of pressures, such as suction and line pressures, may be derived from the operational settings by estimating pressures from previous pressures and times associated with the previous pressures. Exemplary pseudo code for one embodiment of extrapolating pressures is listed below in Appendix B under "Extrapolate pressures." At block 514, the suction pressures are normalized. To normalize the suction pressures, suction pressures are compared to different threshold levels, normalized suction pressures are calculated and desired changes in suction pressure are calculated. Exemplary pseudo code for one embodiment of extrapolating pressures is listed below in Appendix B under "Normalize suction pressures." At block 516, the suction pressure DRA recommendations are generated. To generate suction pressure DRA recommendations, desired changes in suction pressure are utilized to calculate DRA settings for local and downstream pump stations 106a-106n and compare the adjustments to a DRA suction pressure change for the pipeline network 100. Exemplary pseudo code for one embodiment of extrapolating pressures is listed below in Appendix B under "Generate suction pressure based DRA recommendations."

At block 518, the throttling reduction DRA recommendations are generated. To generate throttling reduction DRA recommendations, throttling status is determined from the operational settings. Then, the suction pressures, DRA tuning adjustments and pressure adjustments are calculated and compared to provide an adjustment in the DRA setting to address throttling. Exemplary pseudo code for one embodiment of extrapolating pressures is listed below in Appendix B under "Generate throttling reduction DRA recommendations." Then, the DRA recommendations are verified, as shown in block 520. To verify the DRA recommendations, the recommended change in suction pressure and DRA settings are compared to thresholds for pressures, and trailing and leading edges of fluid commodities are determined from other applications. Exemplary pseudo code for one embodiment of extrapolating pressures is listed below in Appendix B under "Verify DRA recommendations."

At block 522, the DRA settings may be adjusted based on available DRA treatment values versus actual DRA treatment settings. To adjust the DRA settings, the operational settings for each of the pump stations 106a-106n and the recommended amounts to be injected are determined from the calculations above. Then, if the recommended DRA amounts exceed the available amount of DRA, the RTO 210 may calculate a reduction in the amount of DRA for the DRA recommendation. Also, if the fluid commodities include a fluid that involves additional modification, the RTO 210 may adjust the DRA settings based on the specific settings for this type of fluid commodity. Exemplary pseudo code for one embodiment of extrapolating pressures is listed below in Appendix B under "Adjust for available DRA" and "Determine if special batch is at the station." Then, the DRA recommendations are issued, as shown in block 524. To issue the DRA recommendations, the RTO 210 may store operational instructions within the database 208 or transmit the operational instructions to the SCADA application 204. Regardless, the SCADA application 204 may convert the operational instructions into operational settings for the remote devices 122a-122n to communicate with the respective equipment for implementation. Exemplary pseudo code for one embodiment of extrapolating pressures is listed below in Appendix B under "Issue DRA recommendations." At block 526, a determination about whether operations are finished is made. If the operations are not finished, then the pressures are calculated again in block 506. However, if the operations are finished, the DRA tuning process may end at block 528.

In addition to the DRA tuning, other parameters may also be managed through the RTO to enhance operation of the pipeline. For instance, RTO 210 may monitor the pressures within the pipeline via sensors 112a-112n to manage the real-time VFD settings. When a pipeline is operating in gear, the RTO 210 may recommend a pressure setting for VFD pumps. The VFD equipment setting may increase or decrease the VFD pressure to optimize transport of the fluid commodity. For example, the VFD pressure may be decreased if any of the suction pressures are less than or equal to a configured setting for specific suction pressures and all of the line pressures are less than or equal to a configured setting for each line pressure. The VFD pressure may be increased by a value if all of the suction pressures values are greater than or equal to a configured setting for each suction pressure and all of the line pressures values are less than or equal to a configured setting for each line pressure. These adjustments to the VFD equipment settings may be automatic (i.e. without use intervention) or may be implemented with the operator's approval.

Figure 6:
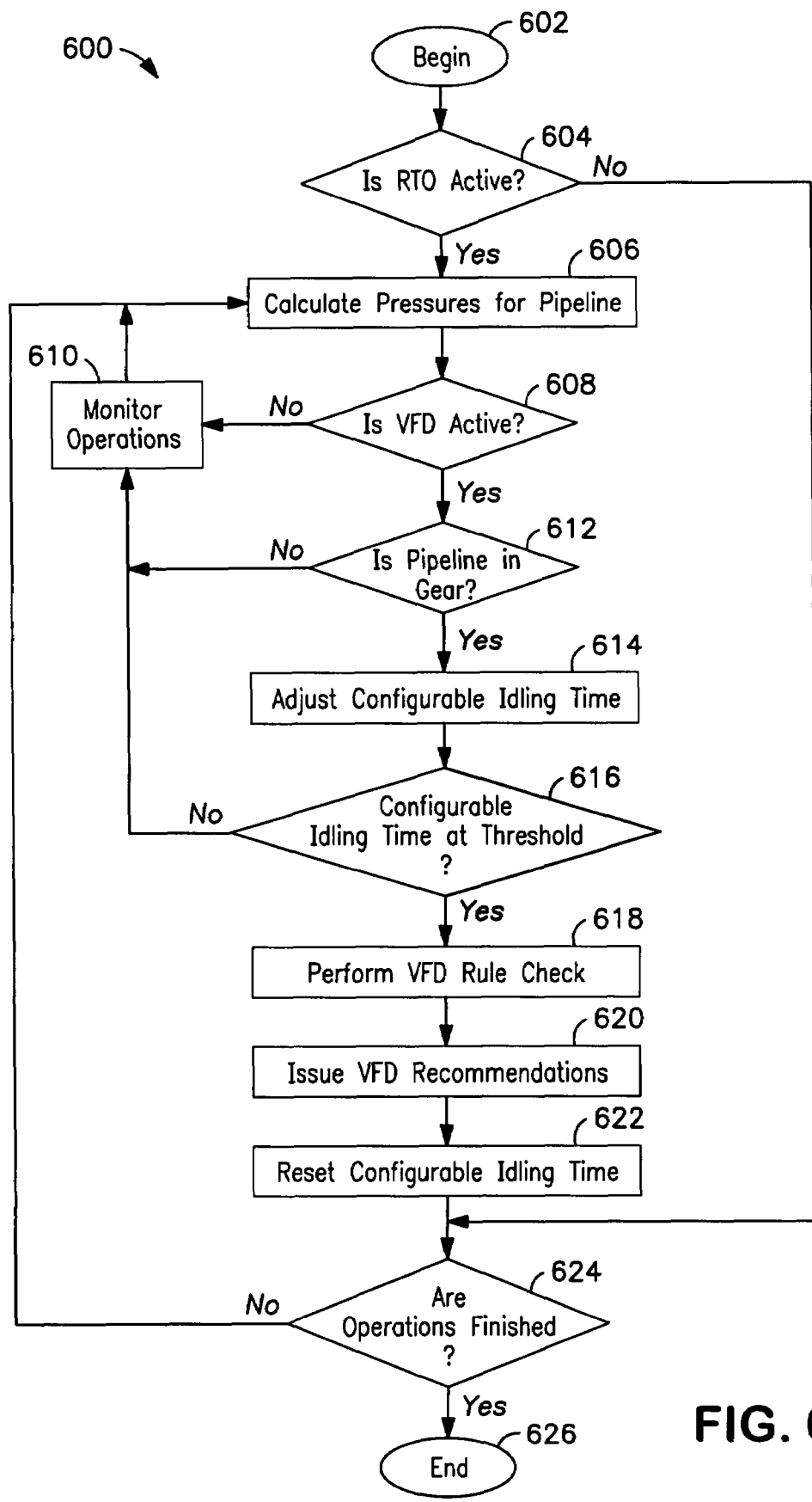
FIG. 6 is an exemplary flow chart of the VFD tuning in the RTO of FIG. 2 in accordance with some aspects of the present techniques.

FIG. 6 is an exemplary flow chart of the VFD tuning in the RTO 210 of FIG. 2 in accordance with some aspects of the present techniques. In FIG. 6, an exemplary flow diagram, which may be referred to by reference numeral 600, describes the use of the RTO 210 to fine tune pressure profiles within the pipeline network 100 by adjusting VFD settings. Accordingly, FIG. 6 may be best understood by concurrently viewing FIGS. 1-4. As specific example of the VFD tuning process, pseudo code is provided in Appendix C and referenced for specific sections of the discussion below for exemplary purposes. Specifically, one embodiment of exemplary pseudo code for the VFD tuning process is listed below in Appendix C under "VFD Recommendation."

The flow chart begins at block 602. At block 604, a determination is made whether the RTO 210 is active. This determination may be performed similar to the discussion of block 408 in FIG. 4. If the RTO 210 is inactive, then a determination about whether operations are finished is made in block 624. The determination about whether operations are finished is similar to the discussion of block 320. As noted above, this determination may be made within a predetermined period (e.g. specific time interval of 60 seconds, for example), based upon a specific event or after specific operations are completed. However, if the RTO 210 is active, then the RTO 210 may calculate pressures for the pipeline network 100, as shown in block 606. The calculation of pressures may involve obtaining pressures, such as suction pressures and line pressures, at different locations within the pipeline network 100 and comparing these pressures to certain pressure limits for the gear or pipeline network 100. The RTO utilizes a calculation to determine approximate future pressures against which to adjust DRA, VFD, other pipeline network equipment settings to shape the pipeline network's actual hydraulic profile towards the empirically determined ideal hydraulic profile per the current pipeline network mode (e.g. batch, energy state, rate regime, etc.). The calculation may be similar to the exemplary pseudo code for calculating the pressures that is listed below in Appendix B under Calculate Suction Pressure Delta & Discharge Pressure Delta.

Then, the RTO 210 determines whether VFD is active, as shown in block 608. This determination, which may be performed similar to the discussion of block 604, may include verifying equipment settings to determine if any of the pumps have VFDs that may be adjusted. For instance, the use of the VFD may be enabled or disabled by the operator toggling a setting within a graphical user interface on the RTO. If the VFD is inactive, then the RTO may monitor operations at block 610. However, if the VFD is active, the RTO 210 determines whether the pipeline is in gear, as shown in block 612. This determination may be based on comparisons of the current equipment settings to the RTO recommended equipment settings, for example. If the pipeline is not in gear, then the operations may be monitored in block 610. However, if the pipeline is in gear, then a configurable idling time may be adjusted, as shown in block 614. For example, if the gear was recently changed, the configurable idling time may be reset to an initial value. Otherwise, the configurable idling time may be a setting that is decreased by a specific value as part of a counter to provide an update within a specific interval.

After the configurable idling time is adjusted, a determination is made whether the configurable idling time has reached a specific threshold, as shown in block 616. For instance, the threshold may be when the configurable idling time is equal to or below zero. If the configurable idling time is above or not at the threshold, then the RTO may continue to monitor operations at block 610. However, if the configurable idling time has reached the threshold, then the RTO may perform a VFD rule check in block 618. The VFD rule check may involve determining if any VFD equipment settings are available for the pipeline's gear, determining if the VFD equipment setting needs to be decreased and/or determining if the VFD equipment setting needs to be increased. For example, the VFD pressure may be decreased if any of the suction pressures are less than or equal to a configured setting for specific suction pressures and all of the line pressures are less than or equal to a configured setting for each line pressure. Further, the VFD pressure may be increased by a value if all of the suction pressures values are greater than or equal to a configured setting for each suction pressure and all of the line pressures values are less than or equal to a configured setting for each line pressure. Exemplary pseudo code for one embodiment of generating an updated recommendation is listed below in Appendix C under "Perform the VFD rule check," "Perform the VFD decrease check" and "Perform the VFD increase check."

Once the VFD rule check is performed, a VFD recommendation may be issued, as shown in block 620. The VFD recommendation may include adjusting the equipment setting for pumps with VFDs. For instance, to issue the VFD recommendations, the RTO 210 may store operational instructions within the database 208 or transmit the operational instructions to the SCADA application 204. Regardless, the SCADA application 204 may convert the operational instructions into operational settings for the remote devices 122a-122n and communicate with the respective equipment for implementation of the VFD equipment settings. The VFD recommendation may be performed automatically without user or operator intervention, or may be presented on a display or monitor as part of the RTO recommendation for the user to select whether to proceed with the VFD recommendation. Once the VFD recommendation has been provided, the configurable idling time may be reset in block 622. At block 624, a determination about whether operations are finished is made. If the operations are not finished, then the pressures are calculated again in block 606. However, if the operations are finished, the VFD tuning process may end at block 626.

An example of the operation of the RTO 210 is described below. To begin, an operator may indicate a desired flow rate for the pipeline network 100, and the location and flow rate of any mid-line deliveries of fluid commodities. The flow rates and locations of deliveries are provided to the SCADA unit 202 as operational instructions entered into one of the control devices 214a-214n and stored in the database 208. For an RTO recommendation, the RTO 210 accesses the operational instructions from the database 208 to determine if a gear has been previously defined for the operational settings. If a gear is defined for the operational settings, the RTO 210 determines whether or not the equipment settings (e.g. pumps settings) are in the desired gear. If they are not, then by evaluating the measured parameters, such as pressures, and the status of equipment in the operational settings, the RTO 210 determines what adjustments to the operational settings should be implemented to bring the pipeline network 100 into gear, to fine tune the flow rates by DRA settings and/or to adjust the VFD settings. If the adjustments are within operational constraints (e.g. within maximum operating pressures), the RTO 210 writes the operational settings into the database 208, and may prompt the SCADA unit 202 to interface with the operator. If the operator fails to adjust the pipeline network 100 into gear, the RTO 210 may wait either a fixed period of time or until certain pressure changes have occurred before another notification about the gear is provided to the operator. Once the pipeline network 100 is in gear, the operator is notified via the SCADA application 204. The RTO 210 then continues to monitor for any gear, DRA and/or VFD setting adjustments, which may be a result of pressure changes in the pipeline network 100, migration of batches in the pipeline network 100, change in power costs due to time of day, or the operator requesting a different flow rate. If any of these events occur, the RTO 210 performs the gear selection process, DRA tuning process and/or VFD tuning process. This example may be more clearly understood from the exemplary screen views provided below in FIGS. 7A-7C.

Figure 7A:
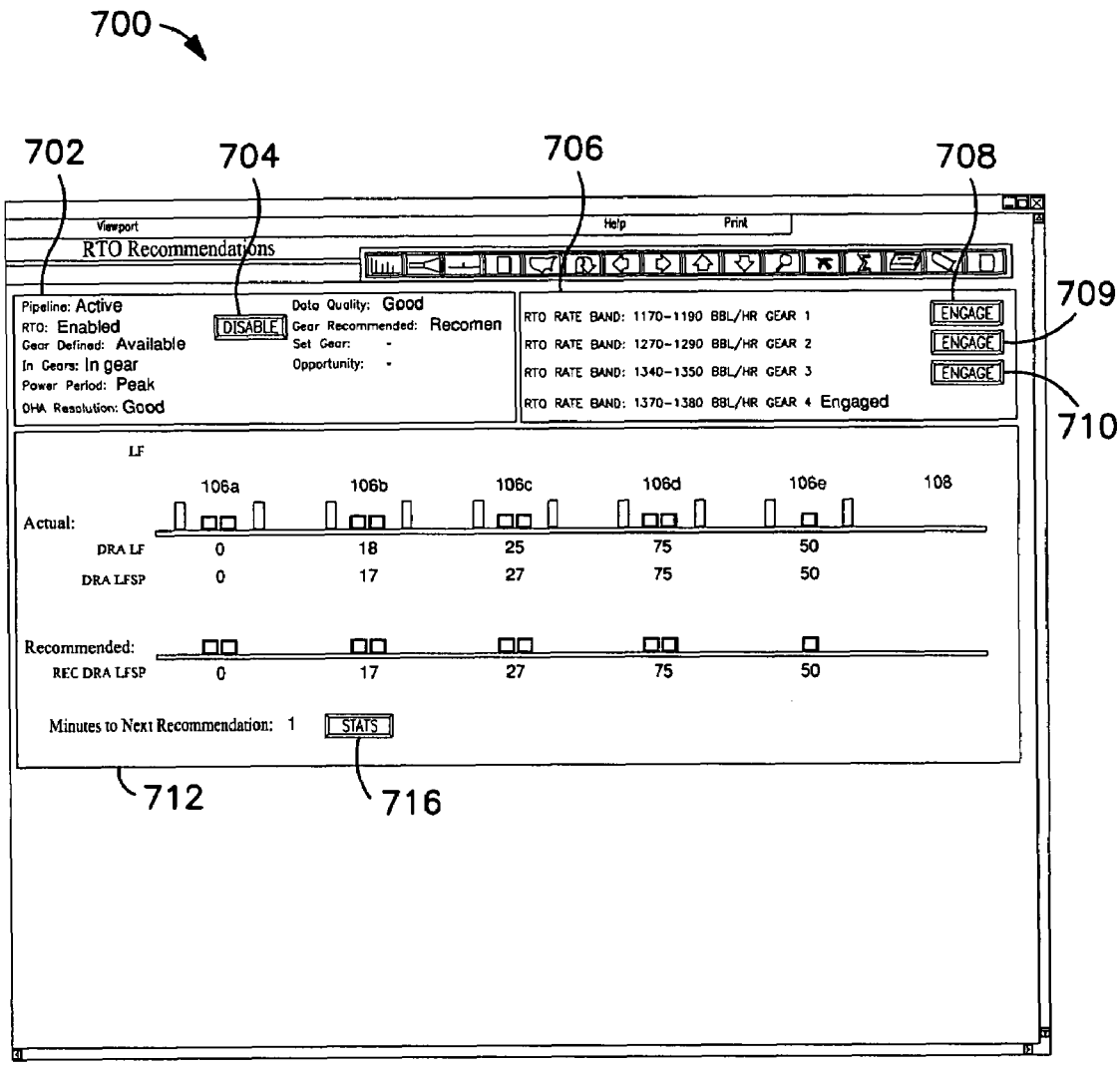
FIGS. 7A-7C are exemplary screen views of the RTO recommendations in accordance with some aspects of the present techniques.
Figure 7B:
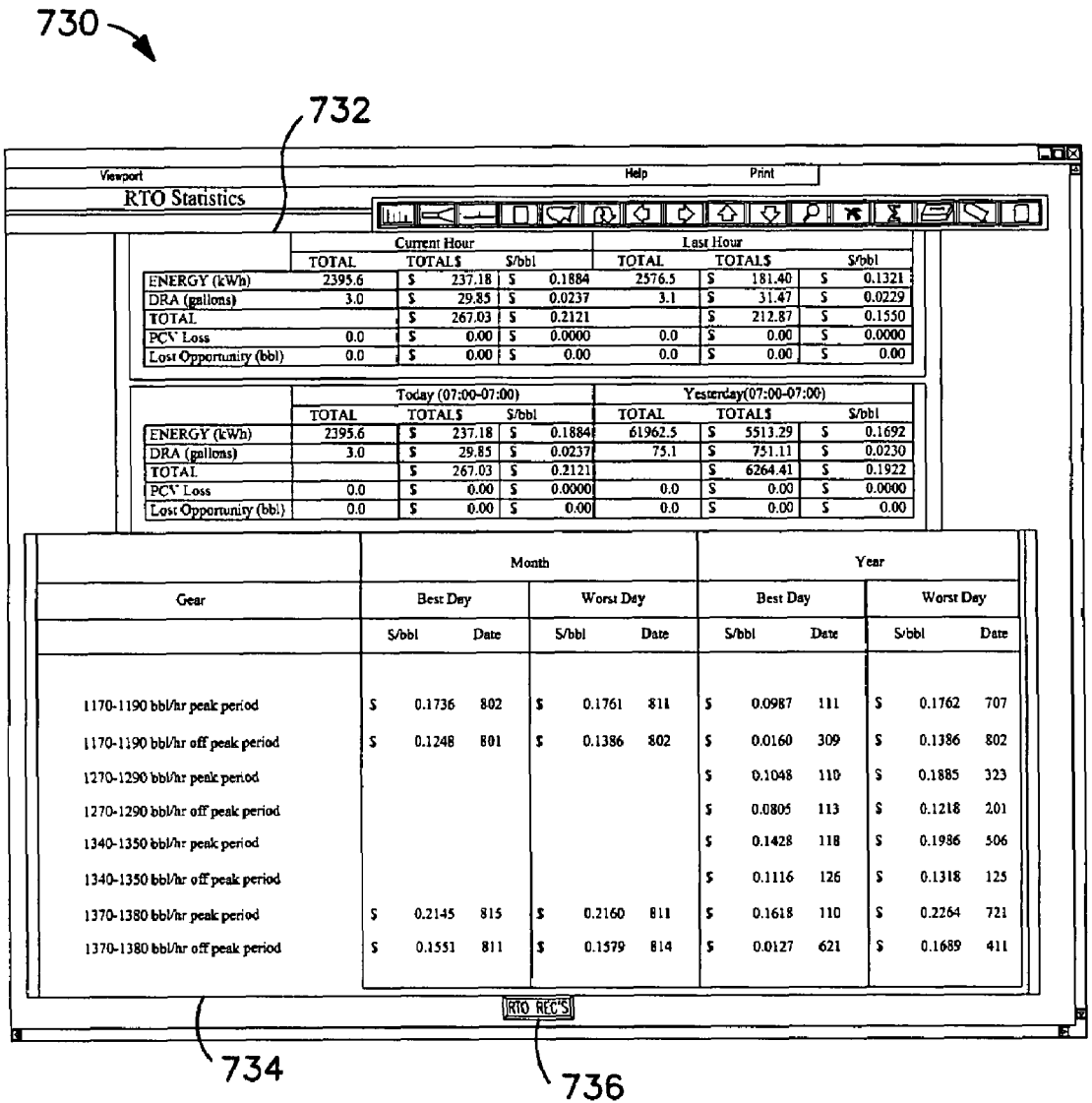
Figure 7C:
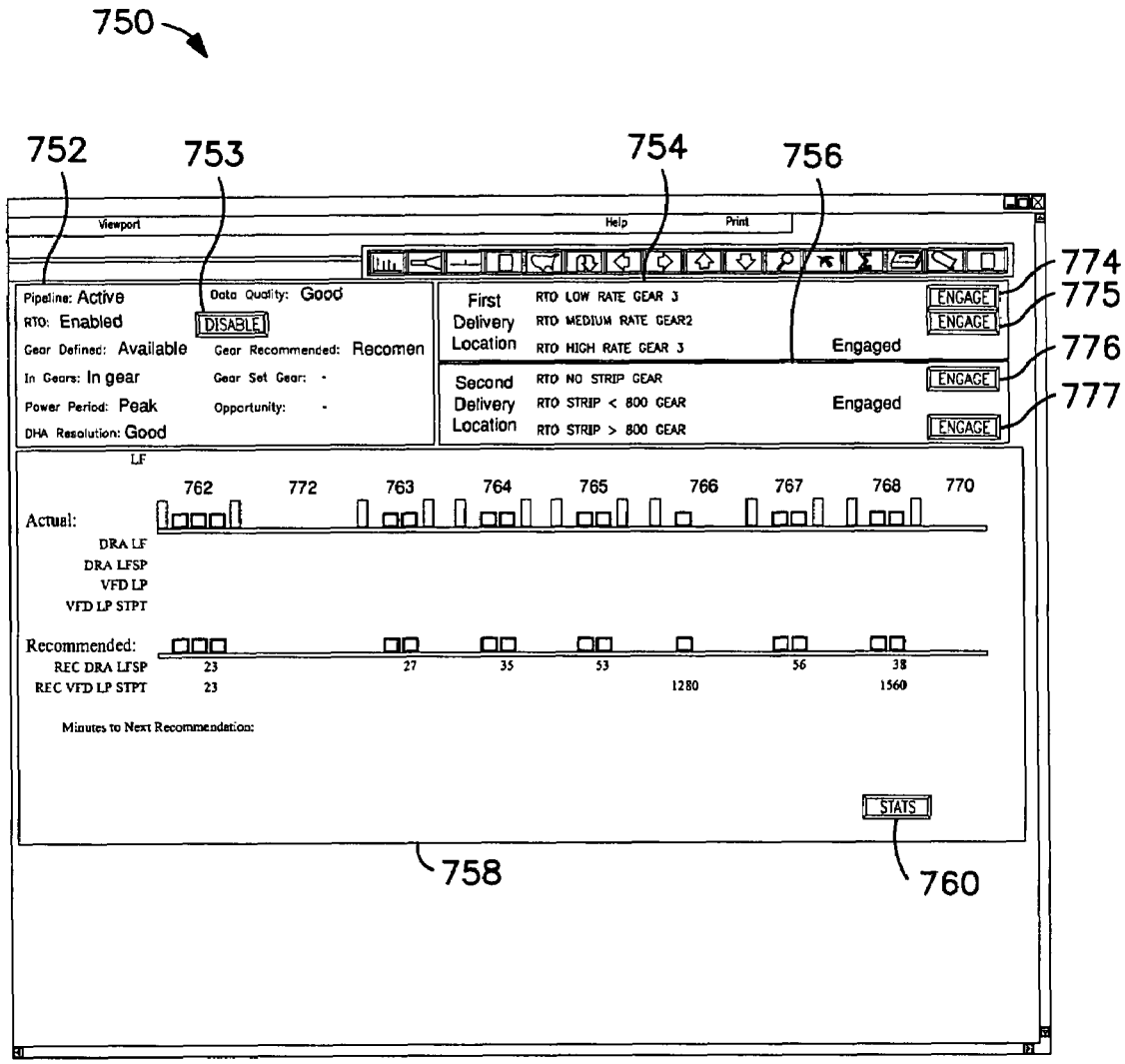

FIGS. 7A-7C are various screen views of the RTO recommendations that include gear selections, DRA settings and/or VFD settings in accordance with embodiments of the present techniques. The screen views 700, 730 and 750 in FIGS. 7A-7C are exemplary graphical user interfaces presented to the operator from the SCADA unit 202. In particular, FIGS. 7A-7B are exemplary screen views for a pipeline network that includes five pump stations 106a-106e with DRA tuning functionality and a single fluid commodity delivery location. FIG. 7C is an exemplary screen view for a pipeline network that includes seven pump stations 762-767 with DRA tuning and/or VFD tuning functionality and multiple fluid commodity delivery locations, such as delivery locations 770 and 772. These screen views are merely one embodiment of RTO recommendations that may be presented to an operator. As it can be appreciated, additional operational settings and data may be presented in other embodiments. For example, additional embodiments of screen views may include any number of different configurations of pump stations 106a-106n with different fields and based on the functionality provided by the specific pipeline network.

To begin in FIGS. 7A-7B, screen views 700 and 730 are graphical user interfaces (GUIs) associated with an RTO recommendation for a pipeline network having five pump stations 106a-106e and a delivery location 108. In the screen view 700, the operational settings and equipment status are divided into various windows or sections. For instance, a first RTO section 702 includes the status or state of various aspects of the pipeline network associated with the operational settings. These status fields, which are shown further in Table 1 below, may include the pipeline, data quality, RTO status, gear defined, set gear, in gear, DRA baseline, power period and opportunity.

TABLE 1

| Status Field | Descriptor | Definition |
| --- | --- | --- |
| Pipeline | 1) ACTIVE | 1) Indicates that one or more pumps on the pipeline are running. RTO deactivates itself when the pipeline is inactive. |
| | 2) INACITVE | 2) Indicates that all pumps on the pipeline are off. RTO is not active when the pipeline is inactive. |
| Data Quality | 1) OK or GOOD | 1) Indicates that the input data required for RTO to operate is available and valid. If the data is not available RTO will deactivate itself. |
| | 2) PRESFAIL | 2) Indicates that the pressure measurements required by RTO have failed or are old at one or more of the stations on the pipeline. |
| | 3) PUMPFAIL | 3) Indicates that the pump status indications required by RTO have failed or are old at one or more of the stations on the pipeline. |
| | 4) LFFAIL | 4) Indicates that the line fill data required by RTO has failed. |
| RTO | 1) ENABLED | 1) Indicates that RTO is turned on and is making gear recommendations and tuning DRA and VFD, if the pipeline is active and the data quality is OK. If the data quality is bad, or the pipeline is inactive, RTO automatically starts when these conditions change. |
| | 2) DISABLED | 2) Indicates that RTO has been has been turned off. Gear recommendations and tuning of DRA and VFD are not done until RTO is enabled. While disabled, the pipeline is still monitored for activity and data quality. |
| Gear Recommended | 1) RECOMMEN | 1) Indicates that the pump starts required to match the gear recommendation are permitted based on RTO evaluation. This may be subject to any specific procedures typically utilized. |
| | 2) GNOTPERM | 2) Indicates that the pump starts required to match the gear recommendation are not permitted based on RTO evaluation. |
| | 3) IDLE | 3) Indicates that RTO is turned off or disabled. |
| Gear Defined | 1) AVAIL | 1) Indicates that a gear is available for the current products in the pipeline, pipeline conditions and rate band. |
| | 2) UNAVAIL | 2) Indicates that no gear has been defined for the current products in the pipeline, pipeline conditions and rate band. RTO automatically disables itself in this situation until such time as a gear is found. |
| | 3) IDLE | 3) indicates that RTO is turned off or disabled |

TABLE 1-continued

| Status Field | Descriptor | Definition |
| --- | --- | --- |
| Set Gear | 1) — | 1) Indicates that no action is necessary or recommended at this time to move the pipeline to the recommended gear. |
| | 2) SET GEAR | 2) Indicates that changes in pump status (booster, mainline, DRA pumps, etc.) are required to bring the pipeline into gear. RTO is indicating that the gear be set by matching the recommended pump lineup. Should this descriptor remain for more than a set period, such as two hours, an alarm occurs as a reminder that the pipeline may be operated in gear. |
| In Gear | 1) IN | 1) Indicates that the pipeline is running in gear. |
| | 2) OUT | 2) Indicates that the pipeline is running out of gear. |
| | 3) IDLE | 3) Indicates that RTO is disabled or inactive. |
| | 4) SHIFT | 4) Indicates that the pipeline has been running in gear but that a gear change is now required. This state may be maintained for certain period of time, such as 30 minutes, after a gear change is called for, after which the pipeline is considered out of gear. |
| Opportunity | 1) — | 1) Indicates that opportunity is not being lost. |
| | 2) LOST | 2) Indicates that the pipeline is not maximizing the opportunity for low cost transport provided by the off peak power periods. |
| Power Period | 1) PEAK | 1) Indicates that peak (full) power rates are currently in effect. |
| | 2) OFF PEAK | 2) Indicates that the off peak (discounted) power rates are currently in effect. |
| | 3) IDLE | 3) Indicates that either RTO is disabled, or the pipeline is not running in a gear. |
| DRA Baseline | 1) OK | 1) Indicates that the current DRA injection rates are not exceeding the baseline. |
| | 2) EXCESS | 2) Indicates that the current DRA injection rates are exceeding and have been exceeding the pipeline baseline by certain amount for a specified period. For instance, the DRA injection rates may exceed baselines by at least fifteen percent (15%) for at least 35 minutes. |

Associated with the RTO status, a RTO virtual button 704 is present and may be utilized to disable or engage the RTO 210 based on the operator's preference. The RTO virtual button 704 provides this functionality by executing the force binary point dialog that comes up when the button is selected.

In a second RTO section 706, the different recommendations for different gears are displayed. These different gears are each associated with different operational settings that may be implemented by the pipeline equipment if the respective gears are engaged. For the different gears not utilized, different virtual buttons 708, 709 and 710 may be utilized to engage one of the different gears. These gears may include rate bands in barrels per hour (BPH) that overlap, are consecutive and/or are separated by gaps depending on the specific operational settings. The pipeline network gears may be presented in any format that is useful to operate the pipeline network in its allowable energy states (BPH, cubic feet per minute (CFPM), etc.).

In a third RTO section 712, certain measured parameters and equipment settings are displayed. In particular, in this example, the DRA line flow (LF) is the actual amount of DRA being injected at each of the pump stations 106a-106e, while the DRA LFSP is the DRA set-point at the field location at each of the pump stations 106a-106e and the RECDRA LFSP is the recommended amount of DRA to be injected at each of the pump stations 106a-106e. Accordingly, from this third RTO section 712, the operator may compare amounts of DRA being provided at each of the pump stations 106a-106e in the pipeline network with the preferred DRA set-point and RTO recommended set-point. The operator can determine if the remote DRA control system is acknowledging and tracking the RTO recommended DRA line flow set-point by comparing the actual DRA line flow provided and measured at the DRA injectors 116a-116e with the remote telemetered DRA line flow set-point and the RTO recommended DRA set-point. Based on whether the RTO is enabled or disengaged, the operator can assess remote DRA unit responsiveness to automatic RTO control application as well as local DRA unit set-point tracking performance. Also, in the third RTO section 712, a virtual button 716 is included that may be utilized to access another screen of statistics, which is shown in FIG. 7B. Further, a field is included to indicate the time until the next RTO recommendation is provided for the operator.

As shown in FIG. 7B, statistical data is provided in various sections of the screen view 730. In a first statistical section 732, statistical information on the operating cost and usage are provided. In particular, the usage of certain materials is presented against various time periods to display operational costs for the fluid commodities being transported through the pipeline network. In particular, the energy usage in kilo watt per hour (kWh), DRA in gallons, PCV (pressure control valve) loss and lost opportunity in bbl are shown for the current and last hour along with current and last day. From this first statistical section 732, the operator may compare the usage of various materials that influence the cost of pipeline operations to adjust operational settings if necessary.

In the second statistical section 734, statistical data on different band rates over different periods of time are presented. Specifically, the statistical data may include band rates for the different gears shown in first RTO section 702 of the screen view 700. For these band rates, the peak and off peak periods for the different gears is shown against the most efficient day versus the worst day for a given month or year. Also, similar to the statistics (STATS) virtual button 716 in screen view 700, a recommendation virtual button 736 is present and may be utilized to switch back to the screen view 700.

FIG. 7C is a screen view 750 of GUIs associated with the RTO recommendation for a pipeline network having seven pump stations 762-767 with DRA tuning and/or VFD tuning functionality and multiple fluid commodity delivery locations, such as delivery locations 770 and 772. In the screen view 750, the operational settings and status are again divided into various windows or sections; For instance, a first RTO section 752 includes the status or state of various aspects of the pipeline network associated with the operational settings and a RTO virtual button 753, which operate similar to the discussion above. However, in this exemplary screen view 750, the other sections are different because multiple delivery locations are utilized along the pipeline network. Similarly, other sections include VFD data in addition to the DRA data discussed above.

In a second RTO section 754, the different recommendations for different gears associated with the first delivery location 770 are displayed. These different gears are again associated with different operational settings that may be implemented by the pipeline equipment if the respective gears are engaged. For the different gears not utilized, different virtual buttons 774 and 775 may be utilized to engage one of the different gears. These gears may include rate bands in barrels per hour (BPH) that overlap, are consecutive and/or are separated by gaps depending on the specific operational settings.

In a third RTO section 756, the different recommendations for different gears associated with the second delivery location 772 are displayed. These different gears are again associated with different operational settings that may be implemented by the pipeline equipment if the respective gears are engaged. For the different gears not utilized, different virtual buttons 776 and 777 may be utilized to engage one of the different gears. These gears may include rate bands in barrels per hour (BPH) that overlap, are consecutive and/or are separated by gaps depending on the specific operational settings.

In a fourth RTO section 758, certain measured parameters and equipment settings are displayed. Similar to the discussion above, the DRA line flow (LF) is the actual amount of DRA being injected at each of the pump stations 762-765, 767 and 768, while the DRA LFSP is the DRA set-point at the field location at each of the pump stations 762-765, 767 and 768 and the RECDRA LFSP is the recommended amount of DRA to be injected at each of the pump stations 762-765, 767 ands 768. Please note that in this example, the pump station 766 does not have DRA tanks and/or DRA injectors. Accordingly, from this fourth RTO section 758, the operator may compare amounts of DRA being provided at each of the pump stations 106a-106e in the pipeline network with the preferred DRA set-point and RTO recommended set-point. Further, the VFD line pressure (LP) is the actual pressure measured at each of the pump stations 766 and 768, while the VFD LP LFSP is the VFD set-point at each of the pump stations 766 and 768 and the REC VFD LFSP is the recommended setting for the VFD at each of the pump stations 766 and 768. Please note that in this example, the pump station 766 and 768 are the only pump stations that have pump equipment with VFDs. Accordingly, with the VFD data, the operator may compare VFD settings at each of the pump stations 766 and 768 in the pipeline network with the preferred VFD set-point and RTO recommended set-point. Thus, the operator can determine if the remote systems are acknowledging and tracking the RTO recommendations for the DRA settings and VFD settings by comparing the actual data and the measured data at the pump stations. The adjustments of the flow rates based on these recommendations are shown in the charts of FIGS. 8A-8L below.

FIGS. 8A-8L are exemplary charts relating to the efficiency of fluid flow through the pipeline network 100 of FIG. 1 using the RTO 210 in accordance with certain aspects of the present techniques. These charts 800-811 qualitatively illustrate how the RTO 210 measures, displays, and adjusts operational settings to enhance pipeline operations. In the charts 800, 803, 806 and 809 of FIGS. 8A, 8D, 8G and 8J, respectively, the pressure 812 in pounds per square inch (psi) for actual hydraulic profiles 820-823 and recommended hydraulic profile 824 are shown against various locations 813, such as pumping stations 106a-106e and 108 of FIG. 7A. In the charts 801, 804, 807 and 810 of FIGS. 8B, 8E, 8H and 8K, respectively, the standard deviation 814 between the respective actual hydraulic profiles 820-823 and recommended hydraulic profiles 824-827 are shown as deviation response curves 828-831 against the time 815. Finally, in the charts 802, 805, 808 and 811 of FIGS. 8C, 8F, 8I and 8L, respectively, the flow rate curves 832-835 for the respective actual hydraulic profiles 820-823 are shown as flow rate 816 in barrels per hour (BPH) against the time 817. Each of these charts 800-811 are discussed further below.

The charts 800-802 in FIGS. 8A-8C are at a point in time Ta when the operator has adjusted the operational settings into a first gear. These operational settings may be based upon the pipeline transport algorithm for the rate band provided by the RTO recommendation. As shown in FIG. 8A, the actual hydraulic profile 820 is divergent from the recommended hydraulic profile 824 at the pumping stations 106c-106e. As shown in FIG. 8B, the deviation response curve 828 is highest for this first gear, which indicates that the fluid flow through the pipeline network is inefficient. In FIG. 8C, the flow rate curve 832 for the pipeline network increases with the initial flow through the pipeline network, but begins to decrease into a steady state as pipeline operations begin.

The charts 803-805 in FIGS. 8D-8F are at a point in time Tb after one or more gears have been implemented for the pipeline network after the time Ta. These operational settings may be again based upon the RTO recommendations for adjustments to gears, DRA settings and/or VFD settings. As shown in FIG. 8D, the actual hydraulic profile 821 more closely resembles the recommended hydraulic profile 824 at the locations 106c-106e. As shown in FIG. 8E, the deviation response curve 829 is decreasing as the adjustments in the operational settings are optimizing the fluid flow through the pipeline network. In FIG. 8F, the flow rate curve 833 for the pipeline network continues to increase the steady state operation because fluid flow through the pipeline network is more efficient.

The charts 806-809 in FIGS. 8G-8I are at a point in time Tc after one or more gears have been implemented for the pipeline network from the time Tb. Similar to discussion above, the operational settings may be adjusted based upon the RTO recommendations for gears, DRA settings and/or VFD settings. As shown in FIG. 8G, the actual hydraulic profile 822 closely resembles the recommended hydraulic profile 824 at each of the locations except location 106e. As shown in FIG. 8H, the deviation response curve 830 continues to decrease as the adjustments in the operational settings are optimizing the fluid flow through the pipeline network. In FIG. 8I, the flow rate curve 834 for the pipeline network continues to increase as the fluid flow during the steady state operation continues to become more efficient.

Finally, the charts 809-811 in FIGS. 8J-8L are at a point in time Td after one or more gears have been implemented for the pipeline network from the time Tc. Again, similar to discussion above, the operational settings may be adjusted based upon the RTO recommendations for gears, DRA settings and/or VFD settings. However, the adjustments to the DRA settings and/or VFD settings may be more preferable at this point to provide a finer level of control over the adjustments to the operational settings. As shown in FIG. 8J, the actual hydraulic profile 823 closely resembles the recommended hydraulic profile 824 for each of the locations. As shown in FIG. 8K, the deviation response curve 831 approaches zero as the adjustments in the operational settings further optimize the fluid flow through the pipeline network. In FIG. 8L, the flow rate curve 835 for the pipeline network begins to plateau at a maximum flow rate that is optimal for the specific operational settings and fluid commodities.

Once the operations are complete, the resulting performance of the gears may be stored into database. After analysis, these new operational settings may be incorporated into an enhanced pipeline transport algorithm that may be utilized by the RTO 210 for another fluid commodity. Relative data to a particular point is captured with the understood purpose of future analysis and study. The data is accessible through configurable periodic or adhoc reporting or by analyzing the raw data itself.

As can be appreciated, the RTO may be an application or set of instructions that are stored within memory of the SCADA unit 202. However, the RTO 210 may also be installed as a separate unit that interacts with the SCADA unit 202 through data communication connections.

In addition, as noted above, the control center 126 may include one or more local or regional SCADA units associated with individual pipeline networks and a master SCADA unit. The master SCADA unit in combination with local or regional SCADA units provide redundancy and computational load sharing.

While the present techniques of the invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

What is claimed is:

1. A method of managing transport of liquid commodities in a pipeline network comprising:
   obtaining a plurality of actual measured operating parameters of the pipeline and operational equipment settings associated with a pipeline network as a liquid commodity is transported through the pipeline network;
   determining a recommendation comprising a plurality of equipment settings associated with equipment disposed along the pipeline network and based on empirical data from previous experience with the transport of liquid commodities through the pipeline network, the recommendation being determined (i) concurrently with the transport of the liquid commodity and (ii) by the deviation between the actual measured operating parameters of the pipeline and the parameters for optimal operation based on the empirical data, to optimize at least one of the plurality of operational equipment settings as the liquid commodity is transported through the pipeline network, and implementing the recommendation by adjusting the equipment settings automatically without user intervention to increase the liquid flow in the pipeline network in steady state operation.

2. The method of claim 1 further comprising obtaining operational instructions associated with transporting the liquid commodity through the pipeline network.

3. The method of claim 2 wherein the operational instructions comprise a flow rate.

4. The method of claim 1 further comprising displaying the recommendation on a display unit.

5. The method of claim 1 wherein the plurality of equipment settings comprise one or more drag-reducing agent settings.

6. The method of claim 1 wherein the plurality of equipment settings comprises one or more variable frequency drive settings.

7. The method of claim 1 wherein the plurality of equipment settings comprise one or more pump settings associated with at least one of a plurality of pumps utilized by the pipeline.

8. The method of claim 1 wherein the plurality of equipment settings comprise one or more of pump status, drag-reducing agent injector statue, valve status, drag-reducing agent injection rate and variable frequency drive settings.

9. The method of claim 8 wherein the plurality of real-time equipment settings comprise one or more pump settings associated at least one of a plurality of pumps utilized by the pipeline.

10. The method of claim 9 further comprising:
    displaying the recommendation on a display unit
    receiving an operational instruction to implement the at least a portion of the recommendation; and
    adjusting at least one of the one or more pump settings based on the operational instructions.

11. The method of claim 1 wherein the operational settings comprise one or more of pump status, drag-reducing agent injector status, valve status, drag-reducing agent injection rate, variable frequency drive settings, height of fluid in a tank, fluid temperature, pressure in pipeline segments, density of the liquid commodity and batch interface.

12. The method of claim 1 wherein the plurality of operational settings comprises measured parameters from sensors disposed along the pipeline network and the plurality of equipment settings.

13. A tangible medium for storing computer readable instructions to manage the flow of liquid commodities in a pipeline network comprising:
    a first set of instructions configured to:
       obtain a plurality of operational settings associated with a pipeline network;
       store the plurality of operational settings; and
    a second set of instructions configured to:
       determine a recommendation comprising a plurality of equipment settings associated with equipment disposed along the pipeline network and based on empirical data from previous experience with the transport of liquid commodities through the pipeline network, the recommendation being determined (i) concurrently with the transport of the liquid commodity based on at least one of the plurality of operational settings, and (ii) by the deviation between the actual measured operating parameters of the pipeline and the parameters for optimal operation, wherein the recommendation comprises a plurality of equipment settings associated with equipment disposed along the pipeline network; and
       provide the recommendation to the first set of instructions to implement the recommendation automatically by adjusting the equipment settings without user intervention to increase the liquid flow in the pipeline network in steady state operation.

14. The tangible medium of claim 13 wherein the first set of instructions is further configured to obtain a flow rate associated with the transport of the commodity through the pipeline network.

15. The tangible medium of claim 13 wherein the first set of instructions are further configured to:
receive operational settings from one or more remote devices;
present the recommendation to a display unit; and
transmit the plurality of equipment settings to the one or more remote devices.

16. The tangible medium of claim 13 wherein the first set of instructions are further configured to receive an indication from an operator to transmit a plurality of equipment settings to the one or more remote devices.

17. The tangible medium of claim 13 wherein the recommendation is presented as a graphical use interface having graphical and textual data about operational settings concurrent with the flow of the liquid commodity through the pipeline network.

18. The tangible medium of claim 13 wherein the plurality of equipment settings comprise one or more of drag-reducing agent settings and variable frequency drive setting.

19. A pipeline network comprising:
pipeline segments;
equipment distributed along the pipeline segments and coupled to the pipeline segments, wherein the equipment is associated with the transport of one or more fluid liquid commodities through the pipeline segments;
a plurality of sensors configured to obtain measured operating parameters from at least one of the pipeline segments end equipment;
a pipeline management unit in communication with the equipment and the plurality of sensors, wherein the pipeline management unit obtains equipment settings from the equipment, obtains the measured operating parameters from the plurality of sensors, communicates required equipment settings to the equipment and receives operational instructions associated with the transport of the one or more liquid commodities through the pipeline segments which are revised automatically in accordance with a recommendation by adjustment of the equipment settings without user intervention to increase the liquid flow in the pipeline network in steady state operation; and
a real-time optimizer in communication with the pipeline management unit and configured to provide a the recommendation to the pipeline management unit for equipment settings required for increasing the liquid flow in the pipeline, wherein the real-time optimizer determines the recommendation based on the at least one of the equipment settings and the measured operating parameters with the recommendation comprising revised equipment settings for the equipment concurrently with the transport of the one or more commodities through the pipeline segments, the recommendation being determined (I) based on empirical data from previous experience with the transport of liquid commodities through the pipeline network and (ii) by the deviation between the actual operating parameters of the pipeline and the parameters for optimal operation, to optimize at least one of the plurality of operational equipment settings as the liquid commodity is transported through the pipeline network.

20. The pipeline network of claim 19 wherein the operational Instructions comprise a flow rate.

21. The pipeline network of claim 19 wherein the pipeline management unit further comprises a display unit that presents the recommendation.

22. The pipeline network of claim 19 wherein the equipment comprises injectors that provide drag-reducing agents to the pipeline network, the plurality of equipment settings comprise drag-reducing agent settings and the pipeline management unit is configured to automatically adjust the drag-reducing agent settings based on the recommendation.

23. The pipeline network of claim 19 wherein the equipment comprises variable frequency drive pumps that provide energy to the liquid commodities in the pipeline network, the plurality of equipment settings comprise variable frequency drive settings and the pipeline management unit is configured to automatically adjust the variable frequency drive settings based on the recommendation.

\* \* \* \* \*